US009516246B2

(12) United States Patent
Shin et al.

(10) Patent No.: US 9,516,246 B2
(45) Date of Patent: Dec. 6, 2016

(54) IMAGE SENSING DEVICE WITH SHARED PIXEL ARCHITECTURE AND EFFICIENT READOUT CIRCUITRY

(71) Applicant: SK hynix Inc., Gyeonggi-do (KR)

(72) Inventors: Min-Seok Shin, Gyeonggi-do (KR); Young-Chul Sohn, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 103 days.

(21) Appl. No.: 14/490,489

(22) Filed: Sep. 18, 2014

(65) Prior Publication Data

US 2015/0326836 A1    Nov. 12, 2015

(30) Foreign Application Priority Data

May 7, 2014    (KR) .................... 10-2014-0054293

(51) Int. Cl.
| | |
|---|---|
| *H04N 5/353* | (2011.01) |
| *H04N 5/357* | (2011.01) |
| *H04N 5/235* | (2006.01) |
| *H04N 5/3745* | (2011.01) |
| *H04N 5/378* | (2011.01) |
| *H04N 9/04* | (2006.01) |

(52) U.S. Cl.
CPC ............ *H04N 5/353* (2013.01); *H04N 5/2353* (2013.01); *H04N 5/357* (2013.01); *H04N 5/3535* (2013.01); *H04N 5/378* (2013.01); *H04N 5/37457* (2013.01); *H04N 9/045* (2013.01); *H04N 2209/047* (2013.01)

(58) Field of Classification Search
None
See application file for complete search history.

(56) References Cited

U.S. PATENT DOCUMENTS

| | | | | |
|---|---|---|---|---|
| 2006/0256221 | A1* | 11/2006 | Mckee | H01L 27/14603 |
| | | | | 348/308 |
| 2006/0266923 | A1* | 11/2006 | Mabuchi | H04N 5/3532 |
| | | | | 250/208.1 |
| 2012/0104232 | A1* | 5/2012 | Hwang | H04N 5/23241 |
| | | | | 250/208.1 |
| 2013/0089175 | A1* | 4/2013 | Mo | H04N 5/355 |
| | | | | 377/49 |

(Continued)

FOREIGN PATENT DOCUMENTS

| | | |
|---|---|---|
| KR | 1020060043071 | 5/2006 |
| KR | 1020080013495 | 2/2008 |

(Continued)

*Primary Examiner* — Shahbaz Nazrul
(74) *Attorney, Agent, or Firm* — IP & T Group LLP

(57) ABSTRACT

An image sensing device includes: a pixel array including a plurality of pixels arranged in row and column directions; a row control portion suitable for controlling a part of a plurality of rows included in the pixel array by an unit of two or more sequential rows so that pixel signals are simultaneously outputted from the pixel array through the sequential rows; a first readout circuit portion suitable for sequentially reading out a part of the pixel signals in row sequence order; a second readout circuit portion suitable for sequentially reading out the rest of the pixel signals in row sequence order; and a storage portion suitable for storing on row by row basis the read out signals sequentially read out in row sequence order from the first and second readout circuit portions.

18 Claims, 25 Drawing Sheets

(56) References Cited

U.S. PATENT DOCUMENTS

| | | | |
|---|---|---|---|
| 2014/0158863 A1* | 6/2014 | Guidash | H04N 5/3535 250/208.1 |
| 2014/0293102 A1* | 10/2014 | Vogelsang | H04N 5/3535 348/294 |
| 2015/0054973 A1* | 2/2015 | Velichko | H04N 5/369 348/218.1 |
| 2015/0055001 A1* | 2/2015 | Bock | H04N 5/378 348/308 |
| 2015/0237282 A1* | 8/2015 | Shimada | H04N 5/23258 348/297 |
| 2015/0245019 A1* | 8/2015 | Engelbrecht | H04N 17/002 348/175 |

FOREIGN PATENT DOCUMENTS

| | | |
|---|---|---|
| KR | 1020090111029 | 10/2009 |
| KR | 1020120022034 | 3/2012 |

* cited by examiner

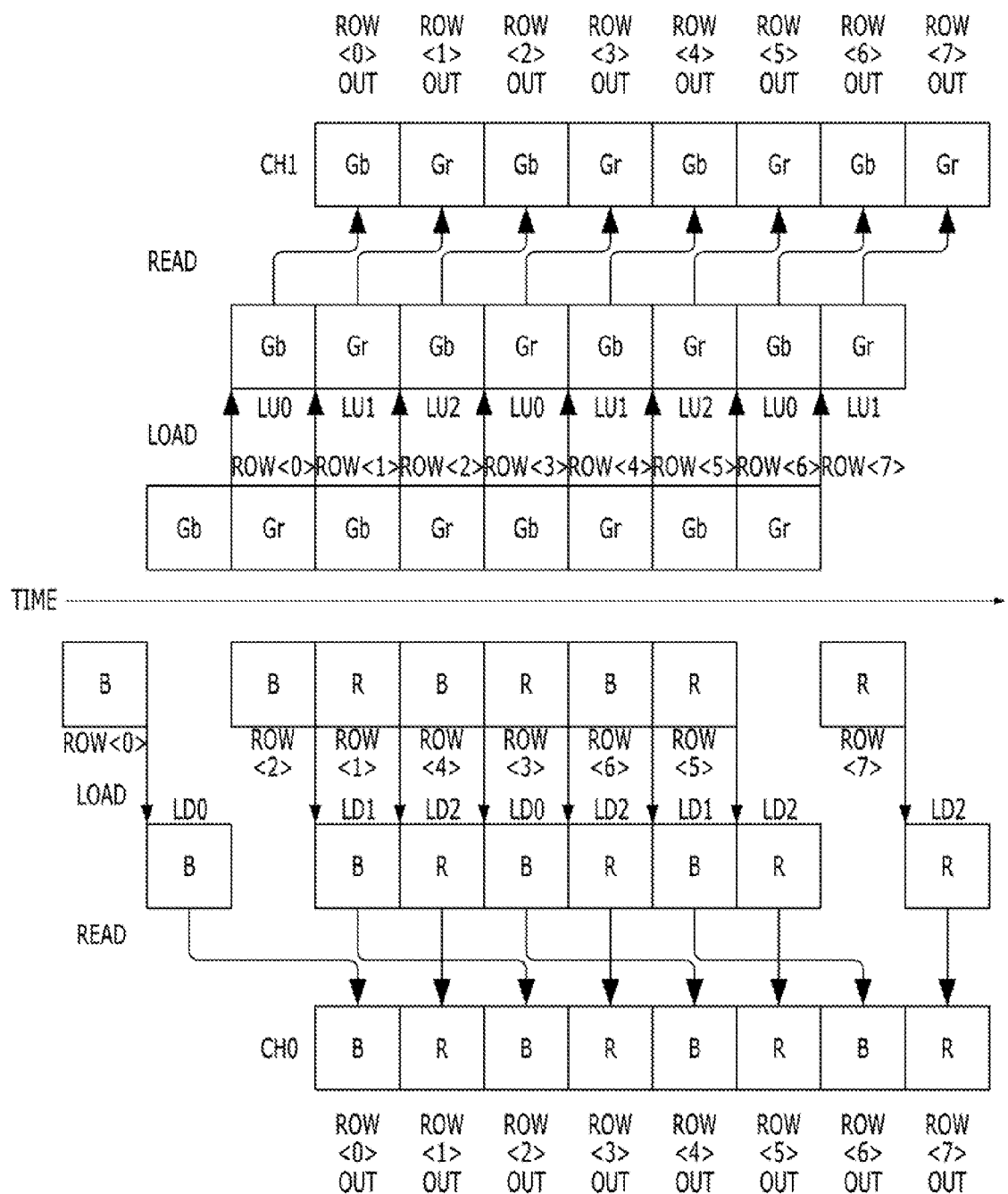

IMAGE SENSING DEVICE WITH SHARED PIXEL ARCHITECTURE AND EFFICIENT READOUT CIRCUITRY

CROSS-REFERENCE TO RELATED APPLICATIONS

The present application claims priority of Korean Patent Application No. 10-2014-0054293, filed on May 7, 2014, which is incorporated herein by reference in its entirety.

BACKGROUND

1. Field

Various exemplary embodiments of the present invention relate to semiconductor design technology, and more particularly to an image sensing device.

2. Description of the Related Art

An image sensor captures an image using characteristics of a semiconductor responsive to incident light. Image sensors are categorized as charge coupled devices (CCD) and CMOS image sensors (CIS). Recently, the CIS-type image sensor has prevailed due to being able to directly integrate analogue and digital control circuits in a single integrated circuit (IC).

SUMMARY

Various exemplary embodiments of the present invention are directed to an image sensing device capable of reading out a pixel signal for each colour with a reduced number of digital line memories.

In an embodiment, an image sensing device may include: a pixel array including a plurality of pixels arranged in row and column directions; a row control portion suitable for controlling a part of a plurality of rows included in the pixel array by a unit of two or more sequential rows so that pixel signals are simultaneously outputted from the pixel array through the sequential rows; a first readout circuit portion suitable for sequentially reading out a part of the pixel signals in row sequence order; a second readout circuit portion suitable for sequentially reading out the rest of the pixel signals in row sequence order; and a storage portion suitable for storing on row by row basis the read out signals sequentially read out in row sequence order from the first and second readout circuit portions.

The row control portion may control both a first row and a last row of the pixel array by the unit of the single row, and the remaining rows of the pixel array by the unit of the pair of sequential rows.

In accordance with the above exemplary embodiments, an image sensing device may read out a pixel signal for each colour thereby reducing colour noise occurring on a readout path. Also, an image sensing device has a reduced number of digital line memories thereby having reducing device size.

BRIEF DESCRIPTION OF THE DRAWINGS

FIG. 23 is a timing diagram illustrating the operation of an image sensing device in accordance with an exemplary embodiment of the present invention.

DETAILED DESCRIPTION

Figure 1:
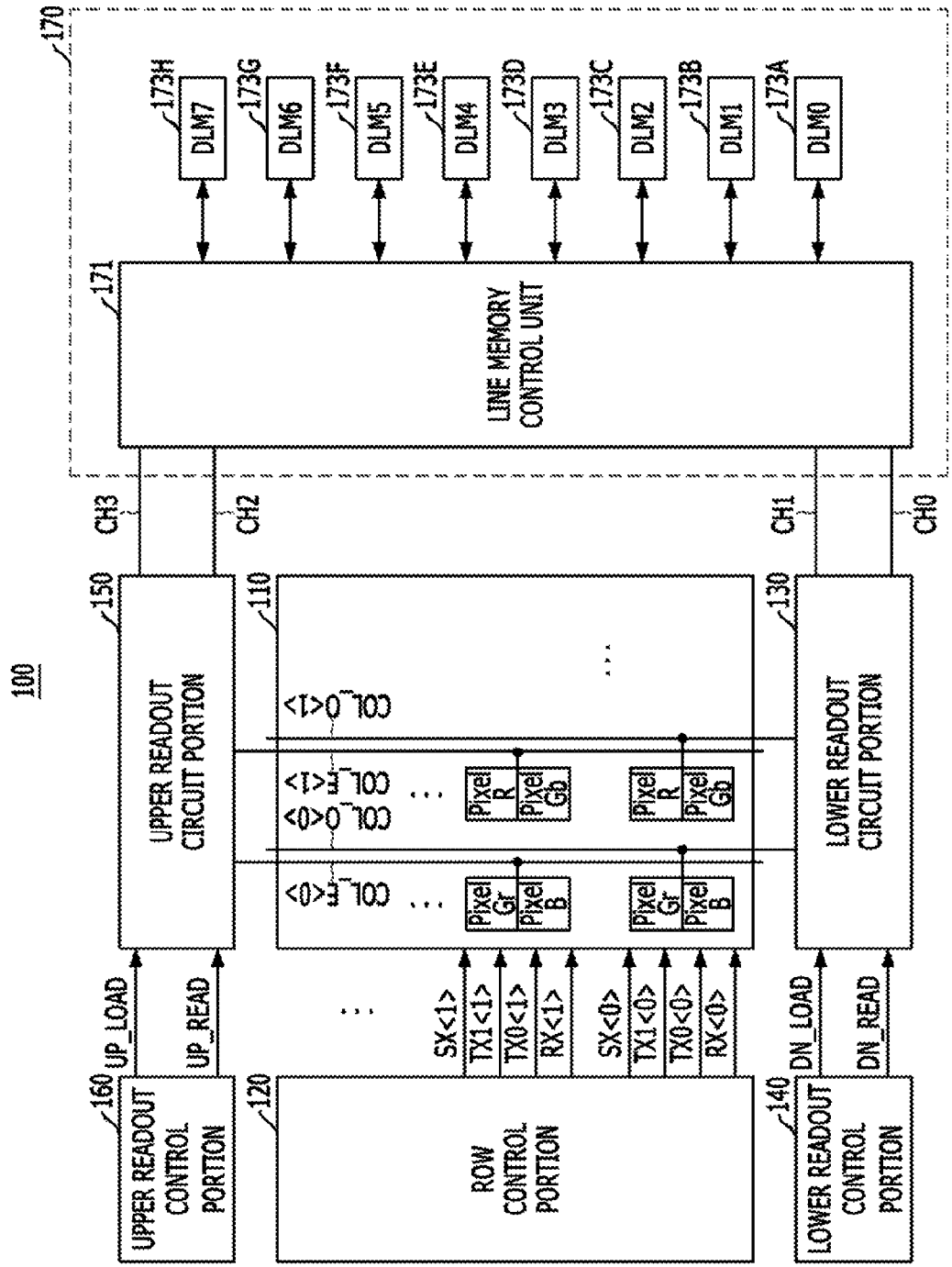
FIG. 1 is a block diagram illustrating an image sensing device in accordance with a comparative example.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. The drawings are not necessarily to scale and in some instances, proportions may have been exaggerated in order to clearly illustrate features of the embodiments. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form, and vice versa, as long as it is not specifically mentioned. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it not only refers to a case where the first layer is formed directly on the second layer or the substrate but also a case where a third layer exists between the first layer and the second layer or the substrate.

FIG. 1 is a block diagram illustrating an image sensing device 100 in accordance with a comparative example.

Referring to FIG. 1, the image sensing device 100 may include a pixel array 110, a row control portion 120, a plurality of odd column lines COL_O<0> to COL_O<n>, a lower readout circuit portion 130, a lower readout control portion 140, a plurality of even column lines COL_E<0> to COL_E<n>, an upper readout circuit portion 150, an upper readout control portion 160, and a storage portion 170.

The pixel array 110 may include a plurality of pixels arranged in both row and column directions. The row control portion 120 may control a plurality of pixels of the pixel array 110 in units of two rows.

The plurality of odd column lines COL_O<0> to COL_O<n> may transmit first pixel signals, which are outputted by the unit of single row from a half of all rows of the pixel array 110. The plurality of even column lines COL_E<0> to COL_E<n> transmit second pixel signals, which are outputted by the unit of single row from the other half of all rows of the pixel array 110.

The lower readout circuit portion 130 may read out the first pixel signals transmitted through the plurality of odd column lines COL_O<0> to COL_O<n>. The lower readout control portion 140 controls the lower readout circuit portion 130.

The upper readout circuit portion 150 may read out the second pixel signals transmitted through the plurality of even column lines COL_E<0> to COL_E<n>. The upper readout control portion 160 may control the upper readout circuit portion 150.

The storage portion 170 includes first to eighth line memory units 173A to 173H, and a line memory control unit 171. The first to eighth line memory units 173A to 173H may store lower digital signals outputted from the lower readout circuit portion 130, and upper digital signals outputted from the upper readout circuit portion 150, and may output the lower and upper digital signals in row sequence order. The line memory control unit 171 may control the first to eighth line memory units 173A to 173H.

The pixel array 110 may be arranged in a predetermined pattern. For example, the pixel array 110 may be arranged in the Bayer pattern. The Bayer pattern may comprise repeated cells of 2 by 2 pixels, and in each of the repeated cells, 2 pixels of the green colours Gr, and Gb may be arranged in diagonally opposite corners, and a single pixel of the red colour R, and single pixel of the blue colour B may be arranged in the remaining corners. Each of the repeated cells is divided into 2 pixel groups in the column direction, each of which may include 2 pixels adjacent to each other in the column direction. That is, the 2 pixels of the green and blue colours Gr and B, and the 2 pixels of the red and green colours R and Gb form the 2 pixel groups of the repeated cell. The pixel group is implemented with the 2-shared pixel structure, by which the pixel group shares one of the plurality of odd column lines COL_O<0> to COL_O<n>, or one of the plurality of even column lines COL_E<0> to COL_E<n>.

Figure 2:
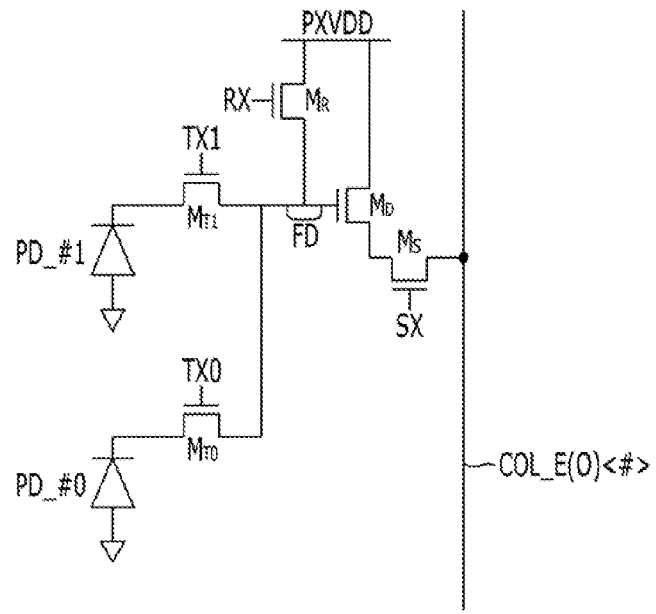
FIG. 2 is a circuit diagram illustrating a pixel group shown in FIG. 1.

FIG. 2 is a circuit diagram illustrating the pixel group shown in FIG. 1.

For example, as shown in FIG. 2, 2 photo diodes PD_#0, and PD_#1, which correspond to 2 pixels of the pixel group, respectively, may be electrically coupled to a floating diffusion node FD in common through 2 transmission transistors MT0, and MT1 by the 2-shared pixel structure. Also the 2 photo diodes PD_#0, and PD_#1 in the 2-shared pixel structure may share an initialization transistor MR, a driving transistor MD, and a selection transistor MS. The 2-shared pixel structure is well-known.

Referring back to FIG. 1, in the pixel array 110, the odd-ordered and even-ordered pixel groups in the column direction may be electrically coupled to one of the plurality of odd column lines COL_O<0> to COL_O<n>, and one of the plurality of even column lines COL_E<0> to COL_E<n>, respectively.

Figure 3:
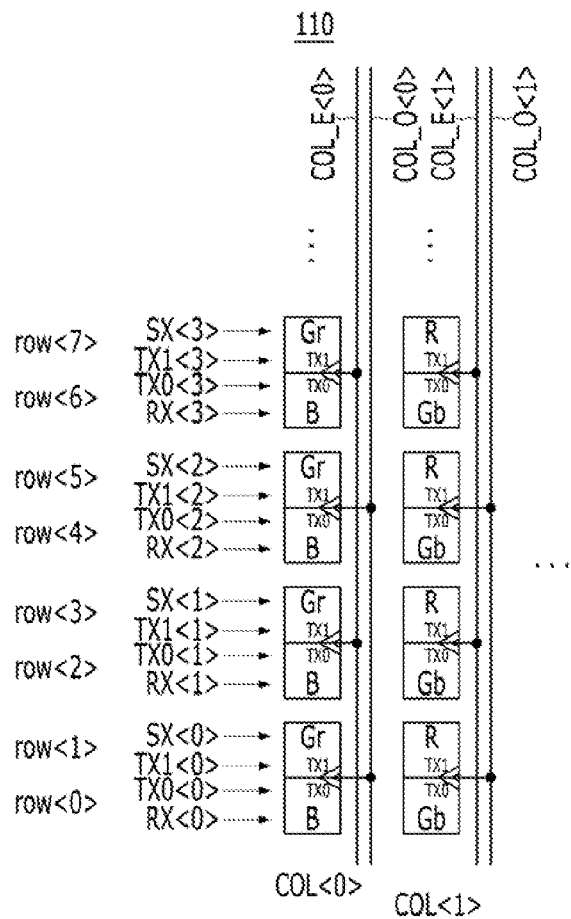
FIG. 3 is a block diagram illustrating a pixel array shown in FIG. 1.

FIG. 3 is a block diagram illustrating the pixel array 110 shown in FIG. 1.

For example, referring to FIG. 3, a first pixel group electrically coupled to a first odd column line COL_O<0> may include pixels of the blue colour B included in a first row ROW<0>, and of the green colour Gr included in a second row ROW<1>. Also, a second pixel group electrically coupled to a first even column line COL_E<0> may include pixels of the blue colour B included in a third row ROW<2>, and of the green colour Gr included in a fourth row ROW<3>. Further, a third pixel group electrically coupled to the first odd column line COL_O<0> may include pixels of the blue colour B included in a fifth row ROW<4>, and of the green colour Gr included in a sixth row ROW<5>. Still further, a fourth pixel group electrically coupled to the first even column line COL_E<0> may include pixels of the blue colour B included in a seventh row ROW<6>, and of the green colour Gr included in a eighth row ROW<7>. In other words, the odd pixel groups of every column may be electrically coupled to the odd column lines COL_O<0> to COL<n> of every column, respectively, and the even pixel groups of every column may be electrically coupled to the even column lines COL_E<0> to COL_E<n> of every column, respectively. Further, each of the odd and even pixel groups comprises a pair of pixels corresponding to a pair of rows. For example, the pair of pixels of odd pixel groups correspond to the pair of first and second rows ROW<0> and ROW<1>, and the pair of fifth and sixth rows ROW<4> and ROW<5>. And the pair of pixels of even pixel groups correspond to the pair of third and fourth rows ROW<2> and ROW<3>, and the pair of seventh and eighth rows ROW<6> and ROW<7>.

Referring back to FIG. 1, the row control portion 120 may control the pair of odd and even pixel groups coupled to the pair of odd and even columns simultaneously. For example, the row control portion 120 may simultaneously control the pair of the first and second pixel groups, which is the pair of odd and even pixel groups, to output the pixel signals through the pair of first odd and even column lines COL_O<0> and COL_E<0>.

The lower readout circuit portion 130 may convert the pixel signals in parallel, which are transmitted through the plurality of odd column lines COL_O<0> to COL_O<n>, into the pixel signals in series, and transmit the pixel signals in series to the storage portion 170.

Figure 4:
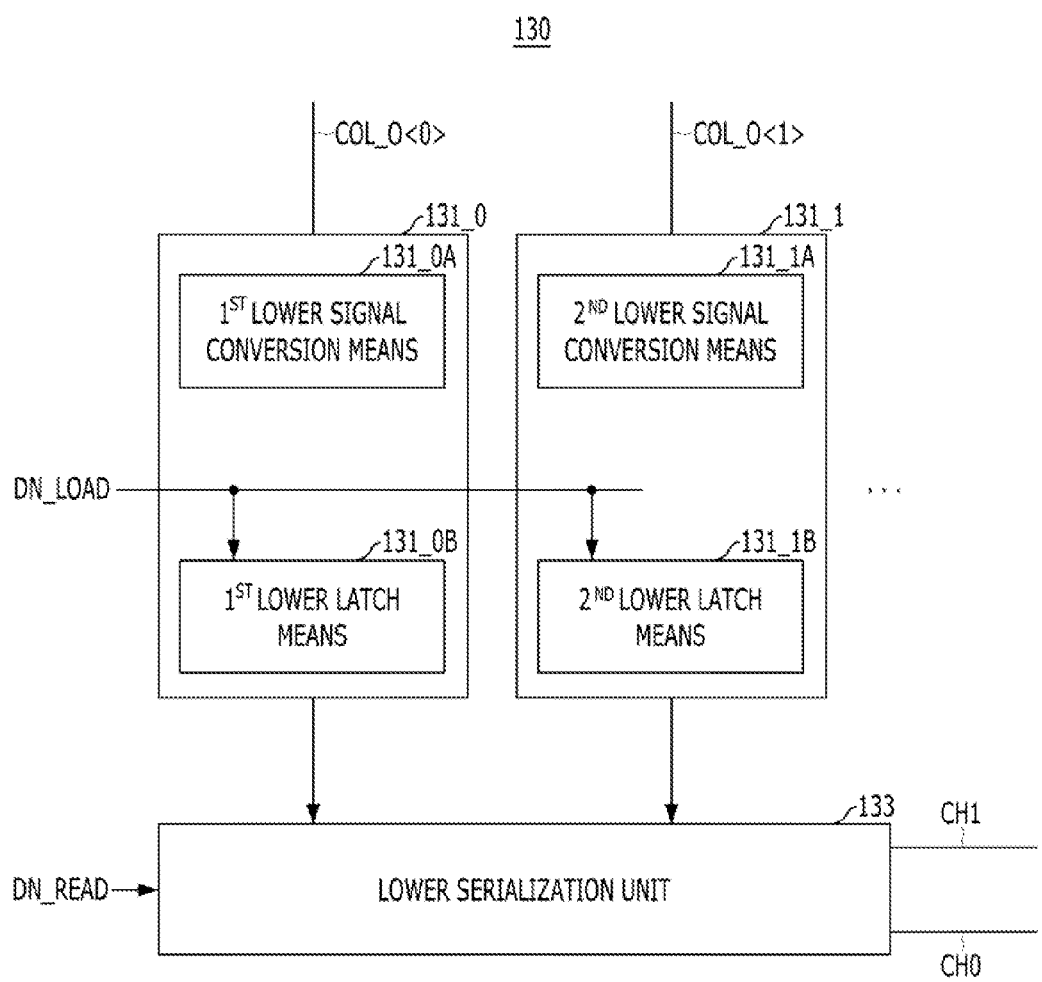
FIG. 4 is a block diagram illustrating a lower readout circuit portion shown in FIG. 1.

FIG. 4 is a block diagram illustrating the lower readout circuit portion 130 shown in FIG. 1.

For example, as shown in FIG. 4, the lower readout circuit portion 130 may include a plurality of lower readout units 131_0 to 131_n, and a lower serialization unit 133. Each of the plurality of lower readout units 131_0 to 131_n may correspond to each of the plurality of odd column lines COL_O<0> to COL_O<n>, respectively. The plurality of lower readout units 131_0 to 131_n may convert the pixel signals transmitted through the plurality of odd column lines COL_O<0> to COL_O<n> into the lower digital signals. The lower serialization unit 133 may serialize the lower digital signals outputted from the plurality of lower readout units 131_0 to 131_n, and may output the serialized lower digital signals on row by row basis.

The plurality of lower readout units 131_0 to 131_n may be the same as each other. A first lower readout unit 131_0 of the plurality of lower readout units 131_0 to 131_n will be described.

The first lower readout unit 131_0 may include a first lower signal conversion means 131_0A, and a first lower latch means 131_0B. The first lower signal conversion means 131_0A may convert the pixel signal transmitted through the first odd column COL_O<0> into the first lower digital signal. The first lower latch means 131_0B may latch the first lower digital signal. The first lower signal conversion means 131_0A may include an analogue to digital converter (ADC). The first lower latch means 131_0B may include a register-type latch for latching multi-bits of the first lower digital signal.

The lower serialization unit 133 may sequentially output on row by row basis the lower digital signals, which are outputted from the plurality of lower readout units 131_0 to 131_n, through first and second channels CH0, and CH1. The lower serialization unit 133 may sequentially output the lower digital signals through a single channel or three or more channels on row by row basis.

Referring to FIGS. 1 and 4, the lower readout control portion 140 may generate a lower latch signal DN_LOAD for controlling the plurality of lower latch means 131_0B, and 131_1B to simultaneously latch the lower digital signals outputted from the plurality of lower signal conversion means 131_0A, and 131_1A, and a lower read signal DN_READ for controlling the lower serialization unit 133 to sequentially output row by row the lower digital signals latched by the plurality of lower latch means 131_0B, and 131_1B.

The upper readout circuit portion 150 may convert the pixel signals in parallel, which are transmitted through the plurality of even column lines COL_E<0> to COL_E<n>, into the pixel signals in series, and transmit the pixel signals in series to the line memory control unit 171.

Figure 5:
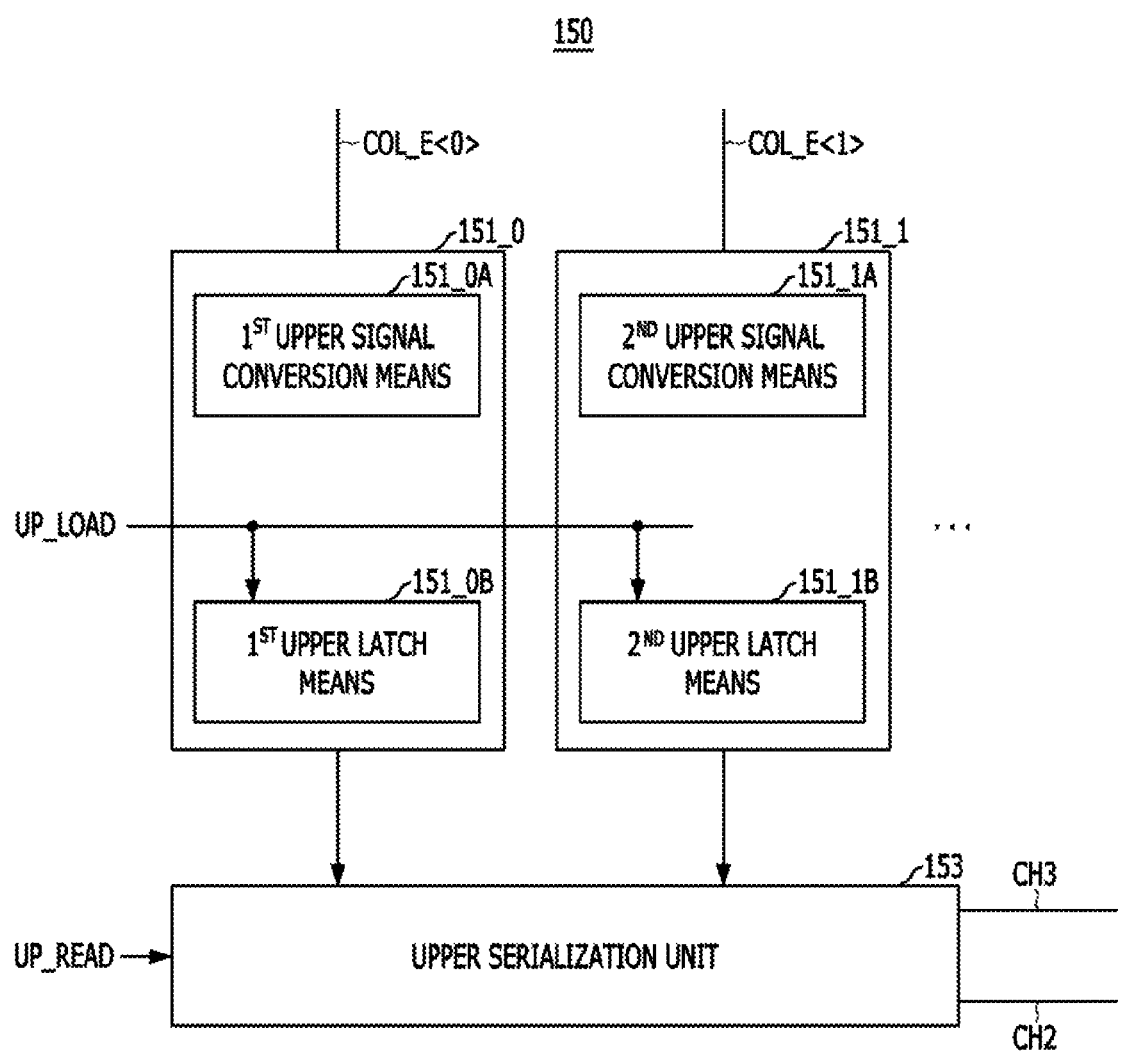
FIG. 5 is a block diagram illustrating an upper readout circuit portion shown in FIG. 1.

FIG. 5 is a block diagram illustrating the upper readout circuit portion 150 shown in FIG. 1.

For example, as shown in FIG. 5, the upper readout circuit portion 150 may include a plurality of upper readout units 151_0 to 151_n, and an upper serialization unit 153. Each of the plurality of upper readout units 151_0 to 151_n may correspond to each of the plurality of even column lines COL_E<0> to COL_E<n>, respectively. The plurality of upper readout units 151_0 to 151_n may convert the pixel signals transmitted through the plurality of even column lines COL_E<0> to COL_E<n> into the upper digital signals. The upper serialization unit 153 may serialize the upper digital signals outputted from the plurality of upper readout units 151_0 to 151_n, and may output the serialized upper digital signals on row by row basis.

The plurality of upper readout units 151_0 to 151_n may be the same as each other. A first upper readout unit 151_0 of the plurality of upper readout units 151_0 to 151_n will be described. The first upper readout unit 151_0 may include a first upper signal conversion means 151_0A, and a first upper latch means 151_0B. The first upper signal conversion means 151_0A may convert the pixel signal transmitted through the first even column COL_E<0> into the first upper digital signal. The first upper latch means 151_08 may latch the first upper digital signal. The first upper signal conversion means 151_0A may include an analogue to digital converter (ADC). The first upper latch means 151_0B may include a register-type latch for latching multi-bits of the first upper digital signal.

The upper serialization unit 153 may sequentially output on row by row basis the upper digital signals, which are outputted from the plurality of upper readout units 151_0 to 151_n, through third and fourth channels CH2, and CH3. The upper serialization unit 153 may sequentially output the lower digital signals through a single channel or three or more channels on row by row basis.

Referring to FIGS. 1 and 5, the upper readout control portion 160 may generate an upper latch signal UP_LOAD for controlling the plurality of upper latch means 151_0B, and 151_1B to simultaneously latch the upper digital signals outputted from the plurality of upper signal conversion means 151_0A, and 151_1A, and an upper read signal UP_READ for controlling the upper serialization unit 153 to sequentially output on row by row basis the upper digital signals latched by the plurality of upper latch means 151_0B, and 151_1B.

The line memory control unit 171 may control the first to eighth line memory units 173A to 173H to store on row by row basis the lower digital signals transmitted through the first and second channels CH0, and CH1, and the upper digital signals transmitted through the third and fourth channels CH2, and CH3, and to sequentially output the lower and upper digital signals, which are stored in the first to eighth line memory units 173A to 173H on row by row basis, in row sequence order.

Each of the first to eighth line memory units 173A to 173H store the digital signals transmitted on row by row basis. For example, the first line memory unit 173A may store the digital signals corresponding to the first row ROW<0>, and the second line memory unit 1736 may store the digital signals corresponding to the second row ROW<1>. Each of the first to eighth line memory units 173A to 173H may include a digital line memory (DLM).

Figure 6:
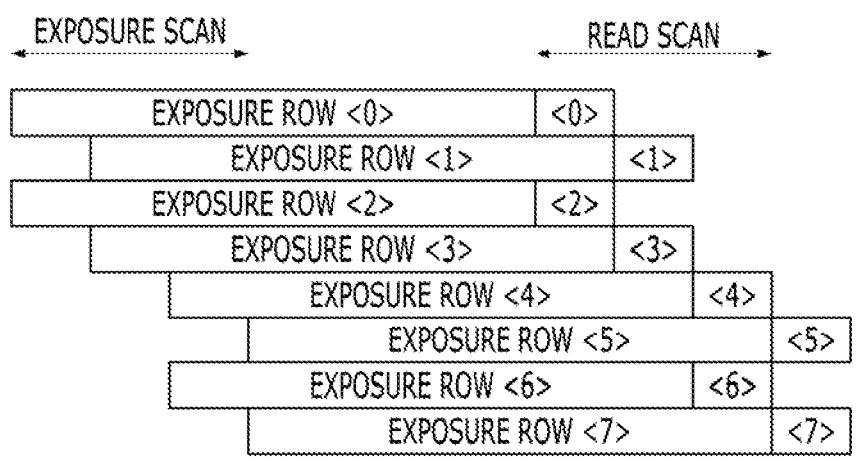
FIG. 6 is a timing diagram illustrating the operation of an image sensing device.
Figure 7:
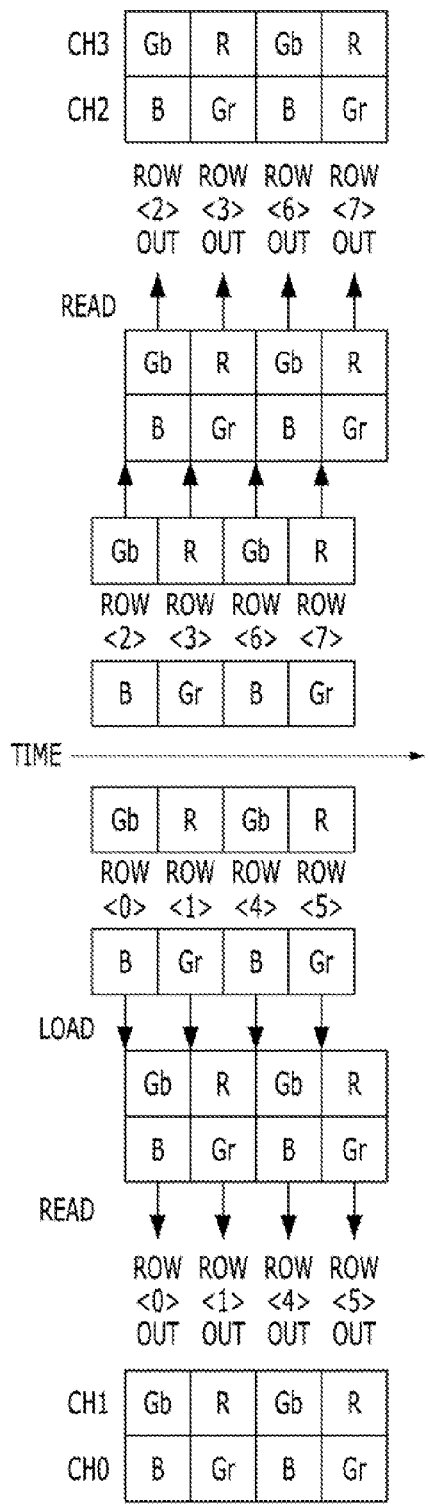
FIG. 7 is a timing diagram illustrating the operation of an image sensing device.
Figure 8:
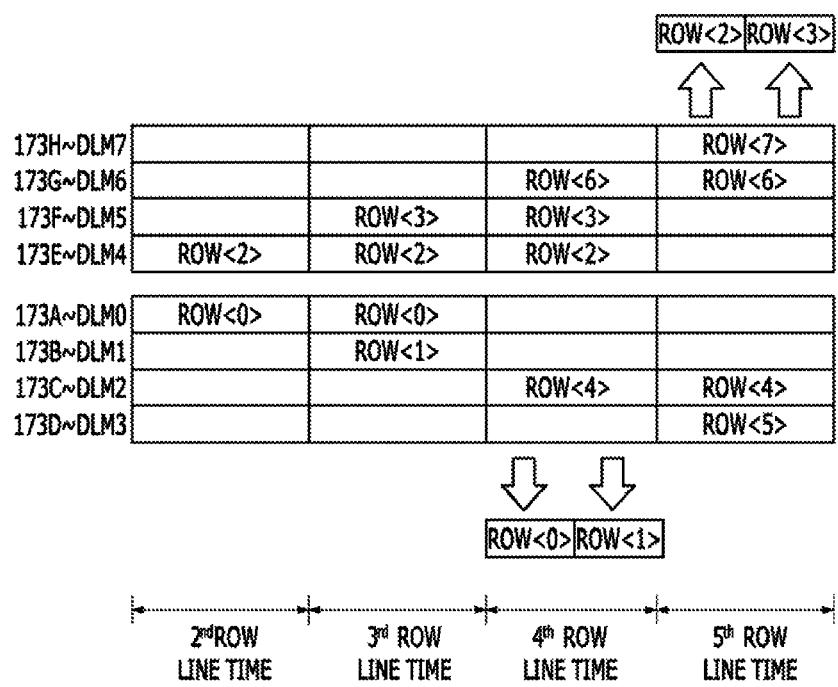
FIG. 8 is a timing diagram illustrating the operation of an image sensing device.

FIGS. 6 to 8 are timing diagrams illustrating operations of the image sensing device 100 shown in FIGS. 1 to 5. Operation of the image sensing device 100 will be described with reference to FIGS. 6 to 8.

FIG. 6 is a timing diagram illustrating operation of the pixel array 110 and the row control portion 120.

Referring to FIG. 6, the row control portion 120 may control the pixel array 110 sequentially by the unit of 2 rows respectively corresponding to the pair of odd and even pixel groups. For example, the row control portion 120 may control the pixel signals to be simultaneously read out from the pixels of the first and third rows ROW<0>, and ROW<2> respectively corresponding to the pair of odd and even pixel groups, then to be simultaneously read out from the pixels of the second and fourth rows ROW<1>, and ROW<3> respectively corresponding to the pair of odd and even pixel groups, then to be simultaneously read out from the pixels of the fifth and seventh rows ROW<4>, and ROW<6> respectively corresponding to the pair of odd and even pixel groups, and then to be simultaneously read out from the pixels of the sixth and eighth rows ROW<5>, and ROW<7> respectively corresponding to the pair of odd and even pixel groups. The row control portion 120 may control the pixel signals to be simultaneously read out from the pixels of the rest of the rows in the same manner. An exposure sequence will be the same as the readout sequence, which is not included in the scope of the present invention.

FIG. 7 is a timing diagram illustrating operation of the lower readout circuit portion 130, and the upper readout circuit portion 150. It is noted that FIG. 7 shows the pixel signals corresponding only to the first and second columns COL<0>, and COL<1> per single row.

As described above, the pixel signals are readout on row by row basis, and each of the odd and even pixel groups corresponds to the pair of rows. Also, the lower readout circuit portion 130 reads out the pixel signals of the odd pixel groups, and the upper readout circuit portion 150 reads out the pixel signals of the even pixel groups. Further, the pixel signals of the pair of odd and even pixel groups are read out simultaneously. Accordingly, the pixel signals are sequentially read out on row by row basis, and readout simultaneously by the pairs of odd and even pixel groups of every column. Hereinafter, the time required for readout of the pixel signals on row by row basis is referred to as the row line time.

Referring to FIG. 7, the lower readout circuit portion 130 reads out the pixel signals in order of the first row ROW<0>, the second row ROW<1>, the fifth row ROW<4>, and the sixth row ROW<5>. At the same time, the upper readout circuit portion 150 reads out the pixel signals in order of the third row ROW<2>, the fourth row ROW<3>, the seventh row ROW<6>, and the eighth row ROW<7>.

Operation of the lower readout circuit portion 130 will be described.

During a first row line time, the lower readout circuit portion 130 may convert each of the pixel signals B, and Gb of the first row ROW<0> into the digital signals, and latch the converted digital signals in the first and second lower latch means 131_0B, and 131_1B.

During a second row line time, the lower readout circuit portion 130 may convert each of the pixel signals Gr, and R of the second row ROW<1> into the digital signals, and latch the converted digital signals in the first and second lower latch means 131_0B, and 131_1B. The digital signals, which correspond to the pixel signals B, and Gb of the first row ROW<0>, and are latched in the first and second lower latch means 131_0B, and 131_1B, may be outputted to the first and second channels CH0, and CH1 by the lower serialization unit 133 before the digital signals corresponding to the pixel signals Gr, and R of the second row ROW<1> are latched into the first and second lower latch means 131_0B, and 131_1B.

During a third row line time, the lower readout circuit portion 130 may convert each of the pixel signals B, and Gb of the fifth row ROW<4> into the digital signals, and latch the converted digital signals in the first and second lower latch means 131_0B, and 131_1B. The digital signals, which correspond to the pixel signals Gr, and R of the second row ROW<1>, and are latched in the first and second lower latch means 131_0B, and 131_1B, may be outputted to the first and second channels CH0, and CH1 by the lower serialization unit 133 before the digital signals corresponding to the pixel signals B, and Gr of the fifth row ROW<4> are latched into the first and second lower latch means 131_0B, and 131_1B.

During a fourth row line time, the lower readout circuit portion 130 may convert each of the pixel signals Gr, and R of the sixth row ROW<5> into the digital signals, and latch the converted digital signals in the first and second lower latch means 131_0B, and 131_1B. The digital signals, which correspond to the pixel signals B, and Gb of the fifth row ROW<4>, and are latched in the first and second lower latch means 131_0B, and 131_1B, may be outputted to the first and second channels CH0, and CH1 by the lower serialization unit 133 before the digital signals corresponding to the pixel signals Gr, and R of the sixth row ROW<5> are latched into the first and second lower latch means 131_0B, and 131_1B. The pixel signals and the digital signals of the other rows not illustrated may be converted, latched, and outputted to the first and second channels CH0, and CH1 in the same way.

Operation of the upper readout circuit portion 150 will be described.

During the first row line time, the upper readout circuit portion 150 may convert each of the pixel signals B, and Gb of the third row ROW<2> into the digital signals, and latch the converted digital signals in the first and second upper latch means 151_0B, and 151_1B.

During the second row line time, the upper readout circuit portion 150 may convert each of the pixel signals Gr, and R of the fourth row ROW<3> into the digital signals, and latch the converted digital signals in the first and second upper latch means 151_0B, and 151_18. The digital signals, which correspond to the pixel signals B, and Gb of the third row ROW<2>, and are latched in the first and second upper latch means 151_0B, and 151_1B, may be outputted to the third and fourth channels CH2, and CH3 by the upper serialization unit 153 before the digital signals corresponding to the pixel signals Gr, and R of the fourth row ROW<3> are latched into the first and second upper latch means 151_0B, and 151_1B.

During the third row line time, the upper readout circuit portion 150 may convert each of the pixel signals B, and Gb of the seventh row ROW<6> into the digital signals, and latch the converted digital signals in the first and second upper latch means 151_0B, and 151_18. The digital signals, which correspond to the pixel signals Gr, and R of the fourth row ROW<3>, and are latched in the first and second upper latch means 151_0B, and 151_1B, may be outputted to the third and fourth channels CH2, and CH3 by the upper serialization unit 153 before the digital signals corresponding to the pixel signals B, and Gr of the seventh row ROW<6> are latched into the first and second upper latch means 151_0B, and 151_18.

During the fourth row line time, the upper readout circuit portion 150 may convert each of the pixel signals Gr, and R of the eighth row ROW<7> into the digital signals, and latch the converted digital signals in the first and second upper latch means 151_0B, and 151_1B. The digital signals, which correspond to the pixel signals B, and Gb of the seventh row ROW<6>, and are latched in the first and second upper latch means 151_0B, and 151_1B, may be outputted to the third and fourth channels CH2, and CH3 by the upper serialization unit 153 before the digital signals corresponding to the pixel signals Gr, and R of the eighth row ROW<7> are latched into the first and second upper latch means 151_0B, and 151_1B. The pixel signals and the digital signals of the other rows not illustrated may be converted, latched, and outputted to the third and fourth channels CH2, and CH3 in the same way.

FIG. 8 is a timing diagram illustrating operation of the line memory control unit 171, and the first to eighth line memory units 173A to 173H.

Referring to FIG. 8, the line memory control unit 171 may store the digital signals of the first row ROW<0>, which are transmitted through the first and second channels CH0, and CH1 during the first row line time, into the first line memory unit 173A during the second row time. At the same time, the line memory control unit 171 may store the digital signals of the third row ROW<2>, which are transmitted through the third and fourth channels CH2, and CH3 during the first row line time, into the fifth line memory unit 173E.

Also, the line memory control unit 171 may store the digital signals of the second row ROW<1>, which are transmitted through the first and second channels CH0, and CH1 during the second row line time, into the second line memory unit 173B during the third row time. At the same time, the line memory control unit 171 may store the digital signals of the fourth row ROW<3>, which are transmitted through the third and fourth channels CH2, and CH3 during the second row line time, into the sixth line memory unit 173F.

Further, the line memory control unit 171 may store the digital signals of the fifth row ROW<4>, which are transmitted through the first and second channels CH0, and CH1 during the third row line time, into the third line memory unit 173C during the fourth row time. At the same time, the line memory control unit 171 may store the digital signals of the seventh row ROW<6>, which are transmitted through the third and fourth channels CH2, and CH3 during the third row line time, into the seventh line memory unit 173G.

The line memory control unit 171 may control the digital signals of the first and second rows ROW<0>, and ROW<1>, which are stored in the first and second line memory units 173A, and 173B during the second and third row line times, to be outputted sequentially in row sequence order during the fourth row line time.

Still further, the line memory control unit 171 may store the digital signals of the sixth row ROW<5>, which are transmitted through the first and second channels CH0, and CH1 during the fourth row line time, into the fourth line memory unit 173D during the fifth row time. At the same time, the line memory control unit 171 may store the digital signals of the eighth row ROW<7>, which are transmitted through the third and fourth channels CH2, and CH3 during the fourth row line time, into the eighth line memory unit 173H.

The line memory control unit 171 may control the digital signals of the third and fourth rows ROW<2>, and ROW<3>, which are stored in the fifth and sixth line memory units 173E, and 173F during the second and third row line times, to be outputted sequentially in row sequence order during the fifth row line time.

After that, the line memory control unit 171, although not illustrated, may store the digital signals of the rows after the eighth row ROW<7> into the first to eighth line memory units 173A to 173H in the same way and in the same sequence. Also, although not illustrated, the line memory control unit 171 may control the digital signals of the fifth and sixth rows ROW<4>, and ROW<5> stored in the third and fourth line memory units 173C, and 173D during the fourth and fifth row line times, the digital signals of the seventh and eighth rows ROW<6>, and ROW<7> stored in the seventh and eighth line memory units 173G, and 173H during the fourth and fifth row line times, and the digital signals of the rows after the eighth row ROW<7> to be outputted sequentially in row sequence order in the same way.

In accordance with the comparative example, the image sensing device may reduce readout time by simultaneous control of the pair of rows.

Figure 9:
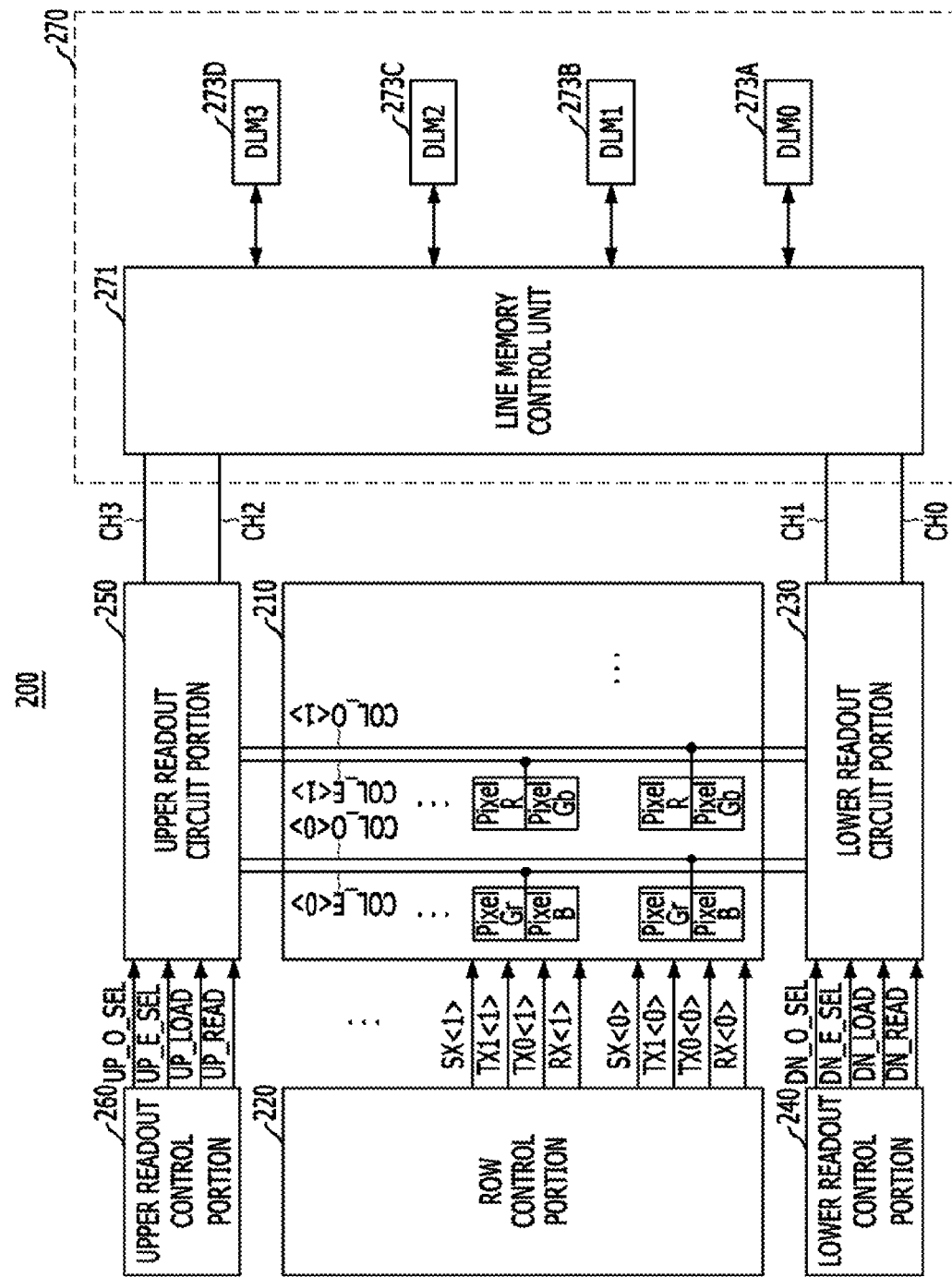
FIG. 9 is a block diagram illustrating an image sensing device in accordance with an exemplary embodiment of the present invention.

FIG. 9 is a block diagram illustrating an image sensing device 200 in accordance with an exemplary embodiment of the present invention.

Referring to FIG. 9, the image sensing device 200 may include a pixel array 210, a row control portion 220, a lower readout circuit portion 230, a lower readout control portion 240, an upper readout circuit portion 250, an upper readout control portion 260, and a storage portion 270. The lower readout circuit portion 230 and the upper readout circuit portion 250 may be coupled to the pixel array 210 through a plurality of odd column lines COL_O<0> to COL_O<n>, and a plurality of even column lines COL_E<0> to COL_E<n>. A pair of odd and even column lines may form a column line group. For example, the pair of first odd and even column lines COL_O<0> and COL_E<0> may form a first column group CLG<0>, and the pair of second odd and even column lines COL_O<1> and COL_E<1> may form a second column group CLG<1>.

The pixel array 210 may include a plurality of pixels arranged in both row and column directions. The row control portion 220 may control a part of a plurality of rows included in the pixel array 210 by the unit of two or more rows so that pixel signals may be simultaneously outputted from the rows of consecutive sequence.

The lower readout circuit portion 230 may sequentially read out a part of the pixel signals in row sequence order. The lower readout control portion 240 may control the lower readout circuit portion 230.

The upper readout circuit portion 250 may sequentially read out the rest of the pixel signals in row sequence order. The upper readout control portion 260 may control the upper readout circuit portion 250.

The storage portion 270 may store digital signals on row by row basis, which are sequentially read out in row sequence order from the lower readout circuit portion 230, and the upper readout circuit portion 250.

The pixel array 210 may be arranged in a predetermined pattern. For example, the pixel array 210 may be arranged in the Bayer pattern. The Bayer pattern may comprise repeated cells of 2 by 2 pixels, and in each of the repeated cells, 2 pixels of the green colours Gr, and Gb may be arranged in diagonally opposite corners, and a single pixel of the red colour R, and a single pixel of the blue colour B may be arranged in the remaining corners. Each of the repeated cells may be divided into 2 pixel groups in the column direction, each of which includes 2 pixels adjacent to each other in the column direction. That is, the 2 pixels of the green and blue colours Gr and B, and the 2 pixels of the red and green colours R and Gb may form the 2 pixel groups of the repeated cell. The pixel group may be implemented with the 2-shared pixel structure, by which the pixel groups share one of the plurality of odd column lines COL_O<0> to COL_O<n>, or one of the plurality of even column lines COL_E<0> to COL_E<n>.

In the pixel array 210, the odd-ordered and even-ordered pixel groups in the column direction may be electrically coupled to one of the plurality of odd column lines COL_O<0> to COL_O<n>, and one of the plurality of even column lines COL_E<0> to COL_E<n>, respectively.

Figure 10:
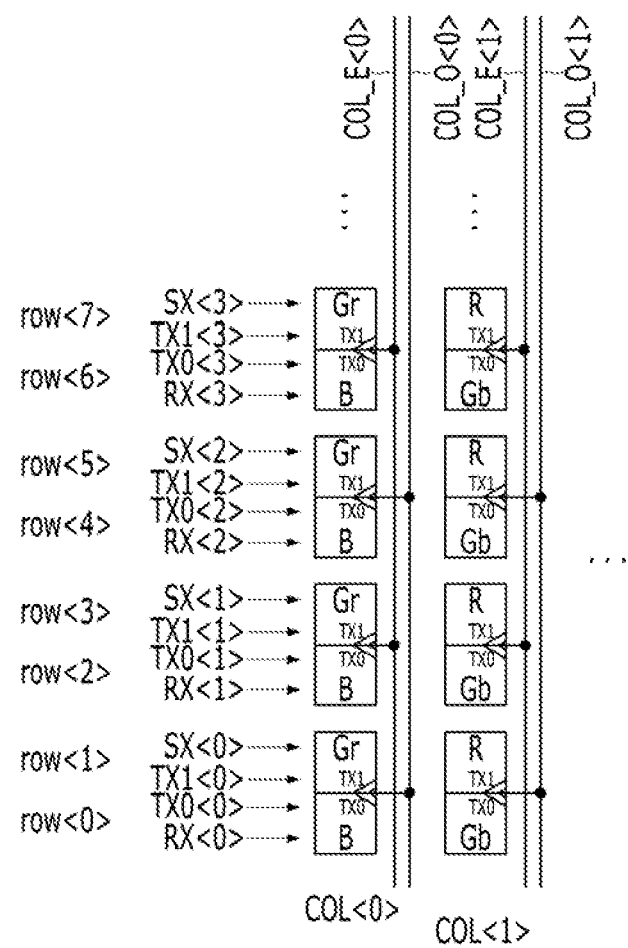
FIG. 10 is a block diagram illustrating a pixel array shown in FIG. 9.

FIG. 10 is a block diagram illustrating the pixel array 210 shown in FIG. 9.

For example, referring to FIG. 10, a first pixel group electrically coupled to a first odd column line COL_O<0> may include pixels of the blue colour B included in a first row ROW<0>, and of the green colour Gr included in a second row ROW<1>. Also, a second pixel group electrically coupled to a first even column line COL_E<0> may include pixels of the blue colour B included in a third row ROW<2>, and of the green colour Gr included in a fourth row ROW<3>. Further, a third pixel group electrically coupled to the first odd column line COL_O<0> may include pixels of the blue colour B included in a fifth row ROW<4>, and of the green colour Gr included in a sixth row ROW<5>. Still further, a fourth pixel group electrically coupled to the first even column line COL_E<0> may include pixels of the blue colour B included in a seventh row ROW<6>, and of the green colour Gr included in a eighth row ROW<7>. In other words, the odd pixel groups of every column may be electrically coupled to the first odd column lines COL_O<0> to COL<n> of every column, respectively, and the even pixel groups of every column may be electrically coupled to the first even column lines COL_E<0> to COL_E<n> of every column, respectively. Further, each of the odd and even pixel groups may comprise a pair of pixels corresponding to a pair of rows. For example, the pair of pixels of odd pixel groups may correspond to the pair of first and second row ROW<0> and ROW<1>, and the pair of fifth and sixth row ROW<4> and ROW<5>. And the pair of pixels of even pixel groups may correspond to the pair of third and fourth row ROW<2> and ROW<3>, and the pair of seventh and eighth row ROW<6> and ROW<7>.

Referring back to FIG. 9, the row control portion 220 may control the pair of odd and even pixel groups coupled to the pair of odd and even columns simultaneously, except for the first and last pixel groups of the first row ROW<0> and the last row (not illustrated) of the pixel array 210. For example, the row control portion 220 may control the first pixel groups of the first row ROW<0> to output the pixel signals through the plurality of odd column lines COL_O<0> to COL_O<n>. Then, the row control portion 220 may simultaneously control the pair of odd and even pixel groups of the following pairs of rows, to output the pixel signals through the pairs of the plurality of odd and even column lines COL_O<0> to COL_O<n> and COL_E<0> to COL_E<n>. And lastly, the row control portion 220 may control the last pixel groups of the last row (not illustrated) to output the pixel signals through the plurality of even column lines COL_E<0> to COL_E<n>.

During the row line time, the lower readout circuit portion 230 may read out the pixel signals of the pair of pixels arranged in diagonally opposite corners of the repeated cell of the pixel array 210, and the upper readout circuit portion 250 may read out the pixel signals of the remaining pair of pixels arranged in diagonally opposite corners of the repeated cell of the pixel array 210. Further, the pixel signals of the 2 pairs of diagonally opposite pixels are read out simultaneously.

The lower readout circuit portion 230 may convert the pixel signals in parallel, which are transmitted alternately through the plurality of odd column lines COL_O<0> to COL_O<n> and the plurality of even column lines COL_E<0> to COL_E<n>, into the pixel signals in series, and transmit the pixel signals in series to the storage portion 270.

Figure 11:
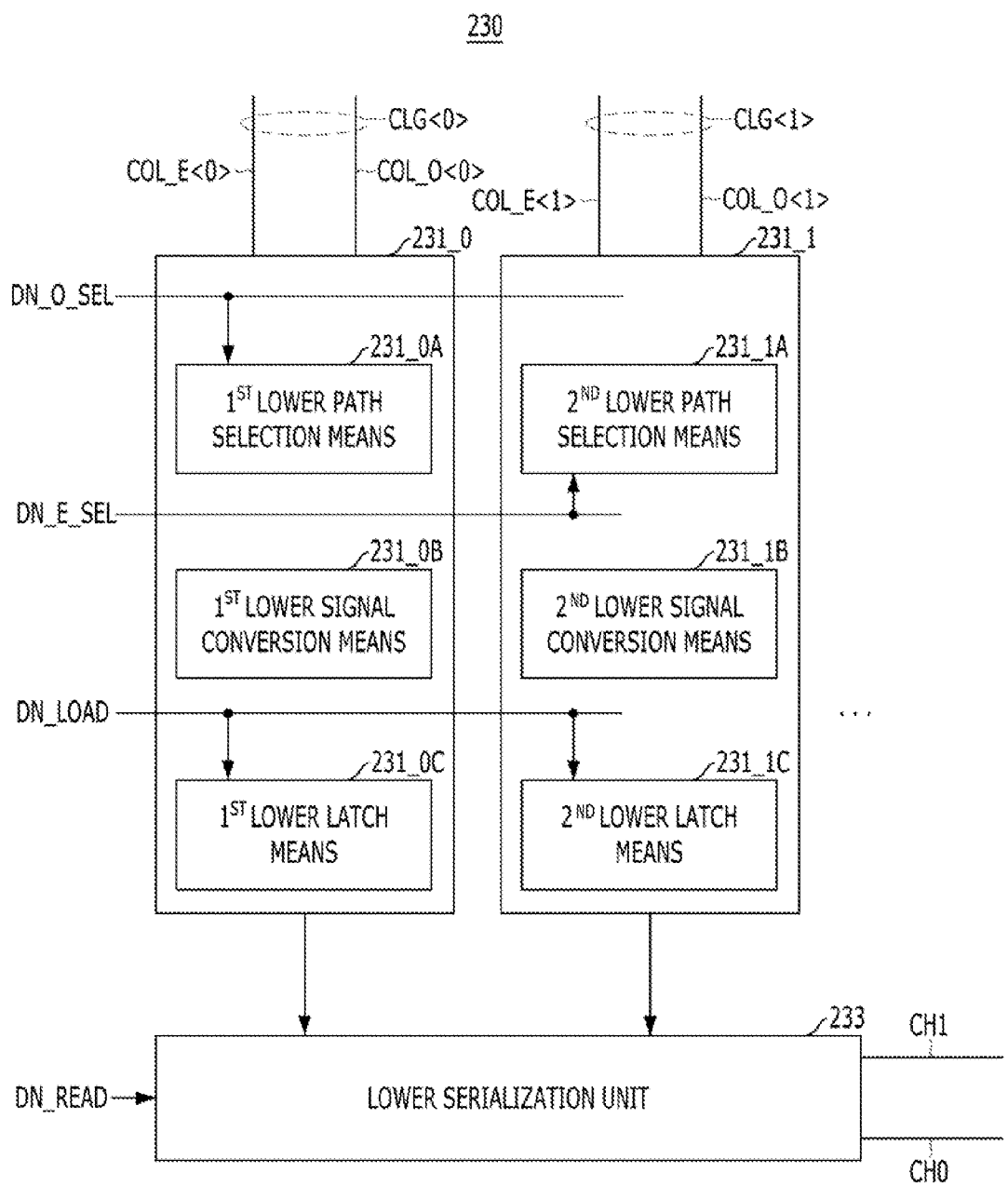
FIG. 11 is a block diagram illustrating a lower readout circuit portion shown in FIG. 9.

FIG. 11 is a block diagram illustrating the lower readout circuit portion 230 shown in FIG. 9.

For example, as shown in FIG. 11, the lower readout circuit portion 230 may include a plurality of lower readout units 231_0 to 231_n, and a lower serialization unit 233. The plurality of lower readout units 231_0 to 231_n may correspond to the plurality of column line groups CLG<0> to CLG<n>, respectively. The plurality of lower readout units 231_0 to 231_n may convert the pixel signals, which are alternately transmitted through the plurality of odd column lines COL_O<0> to COL_O<n> and the plurality of even column lines COL_E<0> to COL_E<n>, into the lower digital signals. The lower serialization unit 233 may serialize the lower digital signals outputted from the plurality of lower readout units 231_0 to 231_n, and may output the serialized lower digital signals on row by row basis.

A plurality of odd lower readout units among the plurality of lower readout units 231_0 to 231_n may be the same as each other. A plurality of even lower readout units among the plurality of lower readout units 231_0 to 231_n may be the same as each other. A first lower readout unit 231_0 of the plurality of odd lower readout units, and a first even lower readout unit 231_1 of the plurality of even lower readout units will be described.

The first lower readout unit 231_0 may include a first lower path selection means 231_0A, a first lower signal conversion means 231_0B, and a first lower latch means 231_0C. The first lower path selection means 231_0A may alternately select one of the first odd column line COL_O<0>, and the first even column line COL_E<0> of the first column group CLG<0> in response to a first lower selection signal DN_O_SEL at every row line time. The first lower signal conversion means 231_0B may convert the pixel signal transmitted through the first lower path selection means 231_0A into the first lower digital signal. The first lower latch means 231_0C may latch the first lower digital signal in response to a lower latch signal DN_LOAD.

The first lower path selection means 231_A may alternately select one of the first odd column line COL_O<0>, and the first even column line COL_E<0> of the first column group CLG<0> according to a logic level of the first lower selection signal DN_O_SEL. The first lower signal conversion means 231_0B may include an analogue to digital converter (ADC). The first lower latch means 231_0C may include a register-type latch for latching multi-bits of the first lower digital signal.

The second lower readout unit 231_1 may include a second lower path selection means 231_1A, a second lower signal conversion means 231_1B, and a second lower latch means 231_1C. The second lower path selection means 231_1A may alternately select one of the second odd column line COL_O<1>, and the second even column line COL_E<1> of the second column group CLG<1> in response to a second lower selection signal DN_E_SEL at every row line time. The second lower signal conversion means 231_1B may convert the pixel signal transmitted through the second lower path selection means 231_1A into the second lower digital signal. The second lower latch means 231_1C may latch the second lower digital signal in response to the lower latch signal DN_LOAD. The second lower path selection means 231_1A may alternately select one of the second odd column line COL_O<1>, and the second even column line COL_E<1> of the second column group CLG<1> according to a logic level of the second lower selection signal DN_E_SEL. The second lower signal conversion means 231_18B may include an analogue to digital converter (ADC). The second lower latch means 231_1C may include a register-type latch for latching multi-bits of the second lower digital signal.

Pairs of an odd-ordered lower readout unit and an even-ordered lower readout unit among the plurality of lower readout units 231_0 to 231_n may select different lines between the odd and even column lines of corresponding column groups during the single row line time. For example, during the row line time, when the first lower path selection means 231_0A selects the first odd column line COL_O<0> of the first column group CLG<0>, the second lower path selection means 231_1A may select the second even column line COL_E<1> of the second column group CLG<1>. Conversely, during the row line time, when the first lower path selection means 231_0A selects the first even column line COL_E<0> of the first column group CLG<0>, the second lower path selection means 231_1A may select the second odd column line COL_O<1> of the second column group CLG<1>.

The lower serialization unit 233 may sequentially output on row by row basis the lower digital signals, which are outputted from the plurality of lower readout units 231_0 to 231_n, through first and second channels CH0, and CH1 in response to a lower read signal DN_READ. The lower serialization unit 233 may sequentially output on row by row basis the lower digital signals through a single channel or three or more of the channels.

Referring to FIGS. 9 and 11, the lower readout control portion 240 may generate the first lower selection signal DN_O_SEL for controlling the odd lower path selection means 231_0A, the second lower selection signal DN_E_SEL for controlling the even lower path selection means 231_1A, a lower latch signal DN_LOAD for controlling the plurality of lower latch means 231_0C, and 231_1C to simultaneously latch the lower digital signals, which are outputted from the plurality of lower signal conversion means 231_0B, and 231_1B, and a lower read signal DN_READ for controlling the lower serialization unit 233 to sequentially output on row by row basis the lower digital signals latched by the plurality of lower latch means 231_0C, and 231_1C. The lower readout control portion 240 may generate the first lower selection signal DN_O_SEL and the second lower selection signal DN_E_SEL, which are alternately toggling.

The upper readout circuit portion 250 may convert the pixel signals in parallel, which are transmitted alternately through the plurality of odd column lines COL_O<0> to COL_O<n> and the plurality of even column lines COL_E<0> to COL_E<n>, into the pixel signals in series, and transmit the pixel signals in series to the storage portion 270.

Figure 12:
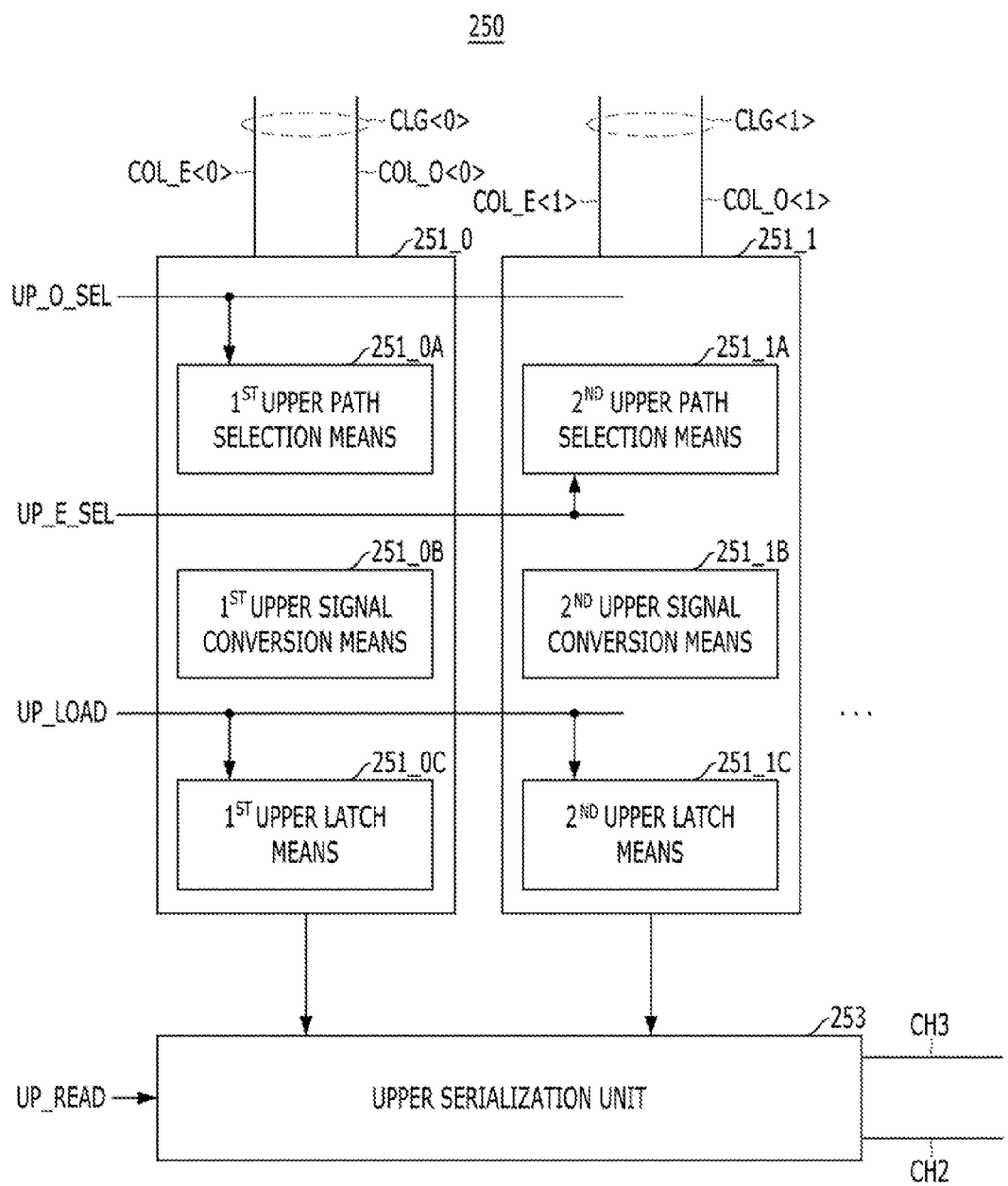
FIG. 12 is a block diagram illustrating an upper readout circuit portion shown in FIG. 9.

FIG. 12 is a block diagram illustrating the upper readout circuit portion 250 shown in FIG. 9.

For example, as shown in FIG. 12, the upper readout circuit portion 250 may include a plurality of upper readout units 251_1 to 251_n, and an upper serialization unit 253. The plurality of upper readout units 251_1 to 251_n may correspond to the plurality of column groups CLG<0> to CLG<n>, respectively. The plurality of upper readout units 251_1 to 251_n may convert the pixel signals, which are alternately transmitted through the plurality of odd column lines COL_O<0> to COL_O<n> and the plurality of even column lines COL_E<0> to COL_E<n>, into the upper digital signals. The upper serialization unit 253 may serialize the upper digital signals outputted from the plurality of upper readout units 251_1 to 251_n, and may output the serialized upper digital signals on row by row basis.

A plurality of odd upper readout units among the plurality of upper readout units 251_1 to 251_n may be the same as each other. A plurality of even upper readout units among the plurality of upper readout units 251_1 to 251_n may be the same as each other. A first upper readout unit 251_0 of the plurality of odd upper readout units, and a first even upper readout unit 251_1 of the plurality of even upper readout units will be described.

The first odd lower readout unit 251_0 may include a first upper path selection means 251_0A, a first upper signal conversion means 251_0B, and a first upper latch means 251_0C. The first upper path selection means 251_0A may alternately select one of the first odd column line COL_O<0>, and the first even column line COL_E<0> of the first column group CLG<0> in response to a first upper selection signal UP_O_SEL at every row line time. The first upper signal conversion means 251_0B may convert the pixel signal transmitted through the first upper path selection means 251_0A into the first upper digital signal. The first upper latch means 251_0C may latch the first upper digital signal in response to an upper latch signal UP_LOAD. The first upper path selection means 251_0A may alternately select one of the first odd column line COL_O<0>, and the first even column line COL_E<0> of the first column group CLG<0> according to a logic level of the first upper selection signal UP_O_SEL. The first upper signal conversion means 251_0B may include an analogue to digital converter (ADC). The first upper latch means 251_0C may include a register-type latch for latching multi-bits of the first upper digital signal.

Pairs of the odd-ordered lower and upper readout units among the plurality of lower readout units 231_0 to 231_n and the plurality of upper readout units 251_0 to 251_n may select different lines between the odd and even column lines of corresponding column groups during the single row line time. For example, during the row line time, when the first lower path selection means 231_0A selects the first odd column line COL_O<0> of the first column group CLG<0>, the first upper path selection means 251_0A may select the first even column line COL_E<0> of the first column group CLG<0>. Conversely, during the row line time, when the first lower path selection means 231_0A selects the first even column line COL_E<0> of the first column group CLG<0>, the first upper path selection means 251_0A may select the first odd column line COL_O<0> of the first column group CLG<0>.

The second lower readout unit 251_1 may include a second upper path selection means 251_1A, a second upper signal conversion means 251_1B, and a second upper latch means 251_1C. The second upper path selection means 251_1A may alternately select one of the second odd column line COL_O<1>, and the second even column line COL_E<1> of the second column group CLG<1> in response to a second upper selection signal UP_E_SEL at every row line time. The second upper signal conversion means 251_1B may convert the pixel signal transmitted through the second upper path selection means 251_1A into the second upper digital signal. The second upper latch means 251_1C may latch the second upper digital signal in response to the upper latch signal UP_LOAD. The second upper path selection means 251_1A may alternately select one of the second odd column line COL_O<1>, and the second even column line COL_E<1> of the second column group CLG<1> according to a logic level of the second upper selection signal UP_E_SEL. The second upper signal conversion means 251_1B may include an analogue to digital converter (ADC). The second upper latch means 251_1C may include a register-type latch for latching multi-bits of the second upper digital signal.

Pairs of the even-ordered lower and upper readout units among the plurality of lower readout units 231_0 to 231_n and the plurality of upper readout units 251_0 to 251_n may select different lines between the odd and even column lines of corresponding column groups during the single row line time. For example, during the row line time, when the second lower path selection means 231_1A selects the second odd column line COL_O<1> of the second column group CLG<1>, the second upper path selection means 251_1A may select the second even column line COL_E<1> of the second column group CLG<I>. Conversely, during the row line time, when the second lower path selection means 231_1A selects the second even column line COL_E<1> of the second column group CLG<1>, the second upper path selection means 251_1A may select the second odd column line COL_O<1> of the second column group CLG<1>.

Eventually, pairs of the odd-ordered lower readout unit and the even-ordered lower readout unit among the plurality of lower readout units 231_0 to 231_n and the plurality of upper readout units 251_0 to 251_n may select the same lines between the odd and even column lines of corresponding column groups during the single row line time. For example, during the row line time, when the first lower path selection means 231_0A selects the first odd column line COL_O<0> of the first column group CLG<0>, the second upper path selection means 251_1A may select the second odd column line COL_O<1> of the second column group CLG<1>. Conversely, during the row line time, when the first lower path selection means 231_0A selects the first even column line COL_E<0> of the first column group CLG<0>, the second upper path selection means 251_1A may select the second even column line COL_E<1> of the second column group CLG<1>.

The upper serialization unit 253 may sequentially output on row by row basis the upper digital signals, which are outputted from the plurality of upper readout units 251_1 to 251_n, through third and fourth channels CH2, and CH3 in response to an upper read signal UP_READ. The upper serialization unit 253 may sequentially output on row by row basis the lower digital signals through a single channel or three or more of channels.

Referring to FIGS. 9 and 12, the upper readout control portion 260 may generate the first upper selection signal UP_O_SEL for controlling the odd upper path selection means 251_0A, the second upper selection signal UP_E_SEL for controlling the even upper path selection means 231_1A, an upper latch signal UP_LOAD for controlling the plurality of upper latch means 251_0C, and 251_1C to simultaneously latch the upper digital signals, which are outputted from the plurality of upper signal conversion means 251_0B, and 251_1B, and an upper read signal UP_READ for controlling the upper serialization unit 253 to sequentially output on row by row basis the upper digital signals latched by the plurality of upper latch means 251_0C, and 251_1C. The upper readout control portion 250 may generate the first upper selection signal UP_O_SEL and the second upper selection signal UP_E_SEL, which are alternately toggling.

The storage portion 270 may include first to fourth line memory units 273A to 273D, and a line memory control unit 271. The first to fourth line memory units 273A to 273D may store lower digital signals outputted from the lower readout circuit portion 230, and upper digital signals outputted from the upper readout circuit portion 250 in row sequence order, and may output the lower and upper digital signals in row sequence order. The line memory control unit 271 may control the first to fourth line memory units 273A to 273D.

The line memory control unit 271 may control the first to fourth line memory units 273A to 273D to store on row by row basis the lower digital signals transmitted through the first and second channels CH0, and CH1, and the upper digital signals transmitted through the third and fourth channels CH2, and CH3, and to sequentially output the lower and upper digital signals, which are stored in the first to fourth line memory units 273A to 273D on row by row basis, in row sequence order.

Each of the first to fourth line memory units 273A to 273D may store the digital signals transmitted on row by row basis. For example, the first line memory unit 273A may store the digital signals corresponding to the first row ROW<0>, and the second line memory unit 273B may store the digital signals corresponding to the second row ROW<1>. Each of the first to fourth line memory units 273A to 273D may include a digital line memory (DLM).

FIGS. 13 to 16 are timing diagrams illustrating operation of the image sensing device 200 in accordance with an exemplary embodiment of the present invention. Operation of the image sensing device 200 will be described with reference to FIGS. 13 to 16.

Figure 13:
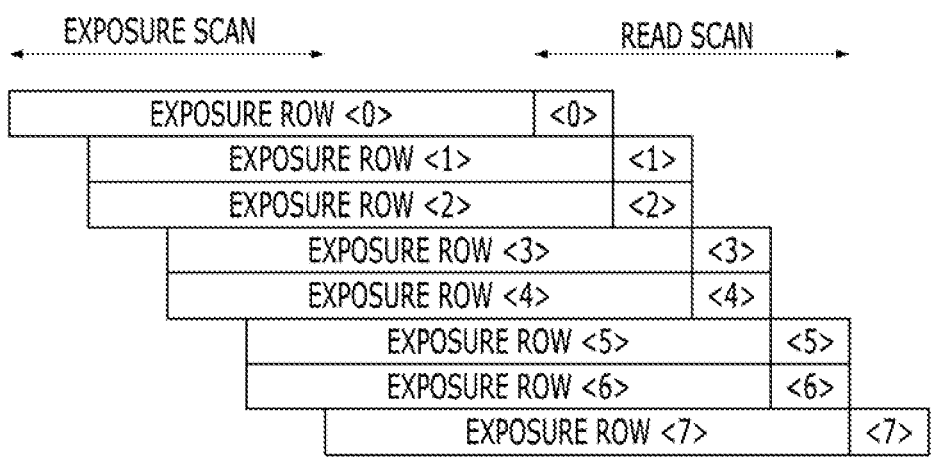
FIG. 13 is a timing diagram illustrating the operation of an image sensing device in accordance with an exemplary embodiment of the present invention.

FIG. 13 is a timing diagram illustrating operation of the pixel array 210 and the row control portion 220.

As described above, the row control portion 220 may control the pair of odd and even pixel groups coupled to the pair of odd and even columns simultaneously, except for the first and last pixel groups of the first row ROW<0> and the last row, for example, the eighth row ROW<7> of the pixel array 210.

Referring to FIG. 13, the row control portion 220 may control the pixel array 210 by the unit of single row, or by the unit of 2 rows respectively corresponding to the pair of odd and even pixel groups. For example, the row control portion 220 may control the pixel signals to be read out from the pixels of the first row ROW<0>. Then, the row control portion 220 may control the pixel signals to be simultaneously read out from the pixels of the second and third rows ROW<1>, and ROW<2> respectively corresponding to the pair of odd and even pixel groups, then to be simultaneously read out from the pixels of the fourth and fifth rows ROW<3>, and ROW<4> respectively corresponding to the pair of odd and even pixel groups, then to be simultaneously read out from the pixels of the sixth and seventh rows ROW<5>, and ROW<6> respectively corresponding to the pair of odd and even pixel groups, and then to be read out from the pixels of the eighth row ROW<7>, which is the last row in the example. The exposure sequence will be the same as the readout sequence, which is not included in the scope of the present invention.

Figure 14:
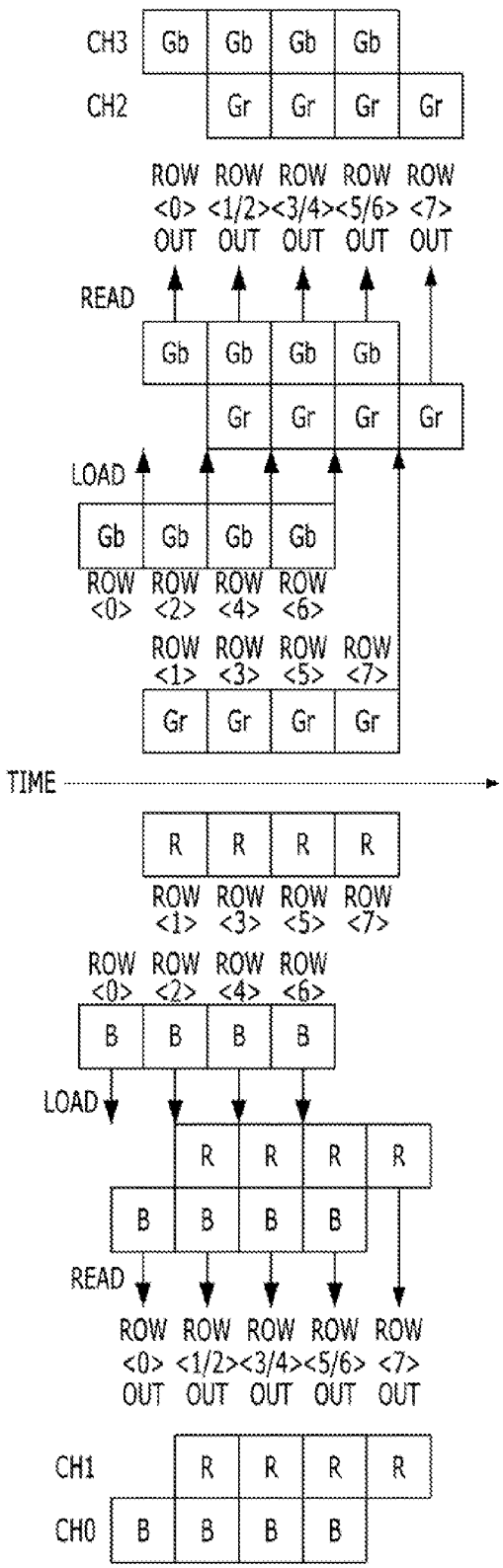
FIG. 14 is a timing diagram illustrating the operation of an image sensing device in accordance with an exemplary embodiment of the present invention.

FIG. 14 is a timing diagram illustrating operation of the lower readout circuit portion 230, and the upper readout circuit portion 250. FIG. 14 shows the pixel signals corresponding only to the first to eighth rows ROW<0> to ROW<7>, and the first and second columns COL<0>, and COL<1>, and shows the pixel signals as blocks. In this example, the first and eighth rows ROW<0> and ROW<7> are the first and last rows, respectively.

As described above, the pixel signals are readout on row by row basis, and each of the odd and even pixel groups may correspond to the pair of rows. Also, the lower readout circuit portion 230 may read out the pixel signals of the pair of pixels arranged in diagonally opposite corners of the repeated cell of the pixel array 210, and the upper readout circuit portion 250 may read out the pixel signals of the remaining pair of pixels arranged in diagonally opposite corners of the repeated cell of the pixel array 210. Further, the pixel signals of the 2 pairs of diagonally opposite pixels of the repeated cell of the pixel array 210 are read out simultaneously. Accordingly, the pixel signals are sequentially read out on row by row basis, and read out simultaneously by the 2 pairs of diagonally opposite pixels of the repeated cell of the pixel array 210.

Referring to FIG. 14, each of the lower and upper readout circuit portions 230 and 250 may read out the pixel signals in order of the first row ROW<0>, the pair of the second and third rows ROW<1> and ROW<2>, the pair of the fourth and fifth rows ROW<3> and ROW<4>, the pair of the sixth and seventh rows ROW<5> and ROW<6>, and the eighth row ROW<7>. The pixel signals to be read out by the lower readout circuit portion 230 may be the pair of diagonally opposite pixels of the repeated cell of the pixel array 210. The pixel signals to be read out by the upper readout circuit portion 250 may be the remaining pair of diagonally opposite pixels of the repeated cell of the pixel array 210.

Operation of the lower readout circuit portion 230 will be described.

During a first row line time, the first lower readout unit 231_0 may read out the pixel signal indicating the blue colour B in the pixel signals of the first row ROW<0>. In detail, the first lower path selection means 231_0A during the first row line time may select the first odd column line COL_O<0>, the first lower signal conversion means 231_0B may convert the pixel signal indicating the blue colour B in the pixel signals of the first row ROW<0> into digital signals, and the first lower latch means 231_0C may latch the converted digital signals corresponding to the pixel signal indicating the blue colour B in the pixel signals of the first row ROW<0>. The second lower readout unit 231_1 may be in a DON'T CARE state, and may not receive any pixel signal.

During a second row line time, the first lower readout unit 231_0 may read out the pixel signal indicating the blue colour B in the pixel signals of the third row ROW<2>. In detail, the first lower path selection means 231_0A during the second row line time may select the first even column line COL_E<0>, the first lower signal conversion means 231_0B may convert the pixel signal indicating the blue colour B in the pixel signals of the third row ROW<2> into the digital signals, and the first lower latch means 231_0C may latch the converted digital signals corresponding to the pixel signal indicating the blue colour B in the pixel signals of the third row ROW<2>.

During the second row line time, the digital signals, which correspond to the pixel signals of the first row ROW<0>, and are latched in the first lower latch means 231_0C during the first row line time, may be outputted to the first and/or second channels CH0, and/or CH1 by the lower serialization unit 233 before the digital signals corresponding to the pixel signals of the third row ROW<2> are latched into the first lower latch means 231_0C.

During the second row line time, the second lower readout unit 231_1 may read out the pixel signal indicating the red colour R in the pixel signals of the second row ROW<1>. In detail, the second lower path selection means 231_1A during the second row line time may select the second odd column line COL_O<1>, the second lower signal conversion means 231_18 may convert the pixel signal indicating the red colour R in the pixel signals of the second row ROW<1> into the digital signals, and the second lower latch means 231_1C may latch the converted digital signals corresponding to the pixel signal indicating the red colour R in the pixel signals of the second row ROW<1>.

During a third row line time, the first lower readout unit 231_0 may read out the pixel signal indicating the blue colour B in the pixel signals of the fifth row ROW<4>. In detail, the first lower path selection means 231_0A during the third row line time may select the first odd column line COL_O<0>, the first lower signal conversion means 231_0B may convert the pixel signal indicating the blue colour B in the pixel signals of the fifth row ROW<4> into the digital signals, and the first lower latch means 231_0C may latch the converted digital signals corresponding to the pixel signal indicating the blue colour B in the pixel signals of the fifth row ROW<4>.

During the third row line time, the digital signals, which correspond to the pixel signals of the third row ROW<2>, and are latched in the first lower latch means 231_0C during the second row line time, may be outputted to the first and/or second channels CH0, and/or CH1 by the lower serialization unit 233 before the digital signals corresponding to the pixel signals of the fifth row ROW<4> are latched into the first lower latch means 231_0C.

During the third row line time, the second lower readout unit 231_1 may read out the pixel signal indicating the red colour R in the pixel signals of the fourth row ROW<3>. In detail, the second lower path selection means 231_1A during the third row line time may select the second even column line COL_E<1>, the second lower signal conversion means 231_18B may convert the pixel signal indicating the red colour R in the pixel signals of the fourth row ROW<3> into the digital signals, and the second lower latch means 231_1C may latch the converted digital signals corresponding to the pixel signal indicating the red colour R in the pixel signals of the fourth row ROW<3>.

During the third row line time, the digital signals, which correspond to the pixel signals of the second row ROW<1>, and are latched in the second lower latch means 231_1C during the second row line time, may be outputted to the first and/or second channels CH0, and/or CH1 by the lower serialization unit 233 before the digital signals corresponding to the pixel signals of the fourth row ROW<3> are latched into the second lower latch means 231_1C.

During a fourth row line time, the first lower readout unit 231_0 may read out the pixel signal indicating the blue colour B in the pixel signals of the seventh row ROW<6>. In detail, the first lower path selection means 231_0A during the fourth row line time may select the first even column line COL_E<0>, the first lower signal conversion means 231_0B may convert the pixel signal indicating the blue colour B in the pixel signals of the seventh row ROW<6> into the digital signals, and the first lower latch means 231_0C may latch the converted digital signals corresponding to the pixel signal indicating the blue colour B in the pixel signals of the seventh row ROW<6>.

During the fourth row line time, the digital signals, which correspond to the pixel signals of the fifth row ROW<4>, and are latched in the first lower latch means 231_0C during the third row line time, may be outputted to the first and/or second channels CH0, and/or CH1 by the lower serialization unit 233 before the digital signals corresponding to the pixel signals of the seventh row ROW<6> are latched into the first lower latch means 231_0C.

During the fourth row line time, the second lower readout unit 231_1 may read out the pixel signal indicating the red colour R in the pixel signals of the sixth row ROW<5>. In detail, the second lower path selection means 231_1A during the fourth row line time may select the second odd column line COL_O<1>, the second lower signal conversion means 231_1B may convert the pixel signal indicating the red colour R in the pixel signals of the sixth row ROW<5> into digital signals, and the second lower latch means 231_1C may latch the converted digital signals corresponding to the pixel signal indicating the red colour R in the pixel signals of the sixth row ROW<5>.

During the fourth row line time, the digital signals, which correspond to the pixel signals of the fourth row ROW<3>, and are latched in the second lower latch means 231_1C during the third row line time, may be outputted to the first and/or second channels CH0, and/or CH1 by the lower serialization unit 233 before the digital signals corresponding to the pixel signals of the sixth row ROW<5> are latched into the second lower latch means 231_1C.

During a fifth row line time, the first lower readout unit 231_0 may be in the DON'T CARE state.

During the fifth row line time, the digital signals, which correspond to the pixel signals of the seventh row ROW<6>, and are latched in the first lower latch means 231_0C during the fourth row line time, may be outputted to the first and/or second channels CH0, and/or CH1 by the lower serialization unit 233 before the first lower readout unit 231_0 falls into the DON'T CARE state.

During the fifth row line time, the second lower readout unit 231_1 may read out the pixel signal indicating the red colour R in the pixel signals of the eighth row ROW<7>. In detail, the second lower path selection means 231_1A during the fifth row line time may select the second even column line COL_E<1>, the second lower signal conversion means 231_1B may convert the pixel signal indicating the red colour R in the pixel signals of the eighth row ROW<7> into digital signals, and the second lower latch means 231_1C may latch the converted digital signals corresponding to the pixel signal indicating the red colour R in the pixel signals of the eighth row ROW<7>.

During the fifth row line time, the digital signals, which correspond to the pixel signals of the sixth row ROW<5>, and are latched in the second lower latch means 231_1C during the fourth row line time, may be outputted to the first and/or second channels CH0, and/or CH1 by the lower serialization unit 233 before the digital signals corresponding to the pixel signals of the eighth row ROW<7> are latched into the second lower latch means 231_1C.

Operation of the upper readout circuit portion 250 will be described.

During the first row line time, the first upper readout unit 251_0 may be in the DON'T CARE state.

During the first row line time, the second odd upper readout unit 251_1 reads out the pixel signal indicating the green colour Gb in the pixel signals of the first row ROW<0>. In detail, the second upper path selection means 251_1A during the first row line time may select the second odd column line COL_O<1>, the second upper signal conversion means 251_1B may convert the pixel signal indicating the green colour Gb in the pixel signals of the first row ROW<0> into the digital signals, and the second upper latch means 251_1C may latch the converted digital signals corresponding to the pixel signal indicating the green colour Gb in the pixel signals of the first row ROW<0>.

During the second row line time, the first upper readout unit 251_0 may read out the pixel signal indicating the green colour Gr in the pixel signals of the second row ROW<1>. In detail, the first upper path selection means 251_0A during the second row line time may select the first odd column line COL_O<0>, the first upper signal conversion means 251_0B may convert the pixel signal indicating the green colour Gr in the pixel signals of the second row ROW<1> into digital signals, and the first upper latch means 251_0C may latch the converted digital signals corresponding to the pixel signal indicating the green colour Gr in the pixel signals of the second row ROW<1>.

During the second row line time, the second odd upper readout unit 251_1 may read out the pixel signal indicating the green colour Gb in the pixel signals of the third row ROW<2>. In detail, the second upper path selection means 251_1A during the second row line time may select the second even column line COL_E<1>, the second upper signal conversion means 251_1B may convert the pixel signal indicating the green colour Gb in the pixel signals of the third row ROW<2> into digital signals, and the second upper latch means 251_1C may latch the converted digital signals corresponding to the pixel signal indicating the green colour Gb in the pixel signals of the third row ROW<2>.

During the second row line time, the digital signals, which correspond to the pixel signals of the first row ROW<0>, and are latched in the second upper latch means 251_1C during the first row line time, may be outputted to the third and/or fourth channels CH2, and/or CH3 by the upper serialization unit 253 before the digital signals corresponding to the pixel signals of the third row ROW<2> are latched into the second upper latch means 251_1C.

During the third row line time, the first upper readout unit 251_0 may read out the pixel signal indicating the green colour Gr in the pixel signals of the fourth row ROW<3>. In detail, the first upper path selection means 251_0A during the third row line time may select the first even column line COL_E<0>, the first upper signal conversion means 251_0B may convert the pixel signal indicating the green colour Gr in the pixel signals of the fourth row ROW<3> into the digital signals, and the first upper latch means 251_0C may latch the converted digital signals corresponding to the pixel signal indicating the green colour Gr in the pixel signals of the fourth row ROW<3>.

During the third row line time, the digital signals, which correspond to the pixel signals of the second row ROW<1>, and are latched in the first upper latch means 251_0C during the second row line time, may be outputted to the third and/or fourth channels CH2, and/or CH3 by the upper serialization unit 253 before the digital signals corresponding to the pixel signals of the fourth row ROW<3> are latched into the first upper latch means 251_0C.

During the third row line time, the second odd upper readout unit 251_1 may read out the pixel signal indicating the green colour Gb in the pixel signals of the fifth row ROW<4>. In detail, the second upper path selection means 251_1A during the third row line time may select the second odd column line COL_O<1>, the second upper signal conversion means 251_1B may convert the pixel signal indicating the green colour Gb in the pixel signals of the fifth row ROW<4> into the digital signals, and the second upper latch means 251_1C may latch the converted digital signals corresponding to the pixel signal indicating the green colour Gb in the pixel signals of the fifth row ROW<4>.

During the third row line time, the digital signals, which correspond to the pixel signals of the third row ROW<2>, and are latched in the second upper latch means 251_1C during the second row line time, may be outputted to the third and/or fourth channels CH2, and/or CH3 by the upper serialization unit 253 before the digital signals corresponding to the pixel signals of the fifth row ROW<4> are latched into the second upper latch means 251_1C.

During the fourth row line time, the first upper readout unit 251_0 may read out the pixel signal indicating the green colour Gr in the pixel signals of the sixth row ROW<5>. In detail, the first upper path selection means 251_0A during the fourth row line time may select the first odd column line COL_O<0>, the first upper signal conversion means 251_0B may convert the pixel signal indicating the green colour Gr in the pixel signals of the sixth row ROW<5> into digital signals, and the first upper latch means 251_0C may latch the converted digital signals corresponding to the pixel signal indicating the green colour Gr in the pixel signals of the sixth row ROW<5>.

During the fourth row line time, the digital signals, which correspond to the pixel signals of the fourth row ROW<3>, and are latched in the first upper latch means 251_0C during the third row line time, may be outputted to the third and/or fourth channels CH2, and/or CH3 by the upper serialization unit 253 before the digital signals corresponding to the pixel signals of the sixth row ROW<5> are latched into the first upper latch means 251_0C.

During the fourth row line time, the second odd upper readout unit 251_1 may read out the pixel signal indicating the green colour Gb in the pixel signals of the seventh row ROW<6>. In detail, the second upper path selection means 251_1A during the fourth row line time may select the second even column line COL_E<1>, the second upper signal conversion means 251_1B may convert the pixel signal indicating the green colour Gb in the pixel signals of the seventh row ROW<6> into the digital signals, and the second upper latch means 251_1C may latch the converted digital signals corresponding to the pixel signal indicating the green colour Gb in the pixel signals of the seventh row ROW<6>.

During the fourth row line time, the digital signals, which correspond to the pixel signals of the fifth row ROW<4>, and are latched in the second upper latch means 251_1C during the third row line time, may be outputted to the third and/or fourth channels CH2, and/or CH3 by the upper serialization unit 253 before the digital signals corresponding to the pixel signals of the seventh row ROW<6> are latched into the second upper latch means 251_1C.

During the fifth row line time, the first upper readout unit 251_0 may read out the pixel signal indicating the green colour Gr in the pixel signals of the eighth row ROW<7>. In detail, the first upper path selection means 251_0A during the fifth row line time may select the first even column line COL_E<O>, the first upper signal conversion means 251_0B may convert the pixel signal indicating the green colour Gr in the pixel signals of the eighth row ROW<7> into digital signals, and the first upper latch means 251_0C may latch the converted digital signals corresponding to the pixel signal indicating the green colour Gr in the pixel signals of the eighth row ROW<7>.

During the fifth row line time, the digital signals, which correspond to the pixel signals of the sixth row ROW<5>, and are latched in the first upper latch means 251_0C during the fourth row line time, may be outputted to the third and/or fourth channels CH2, and/or CH3 by the upper serialization unit 253 before the digital signals corresponding to the pixel signals of the eighth row ROW<7> are latched into the first upper latch means 251_0C.

During the fifth row line time, the second odd upper readout unit 251_1 may be in the DON'T CARE state.

During the fifth row line time, the digital signals, which correspond to the pixel signals of the seventh row ROW<6>, and are latched in the second upper latch means 251_1C during the fourth row line time, may be outputted to the third and/or fourth channels CH2, and/or CH3 by the upper serialization unit 253 before the second odd upper readout unit 251_1 falls in the DON'T CARE state.

Figure 15:
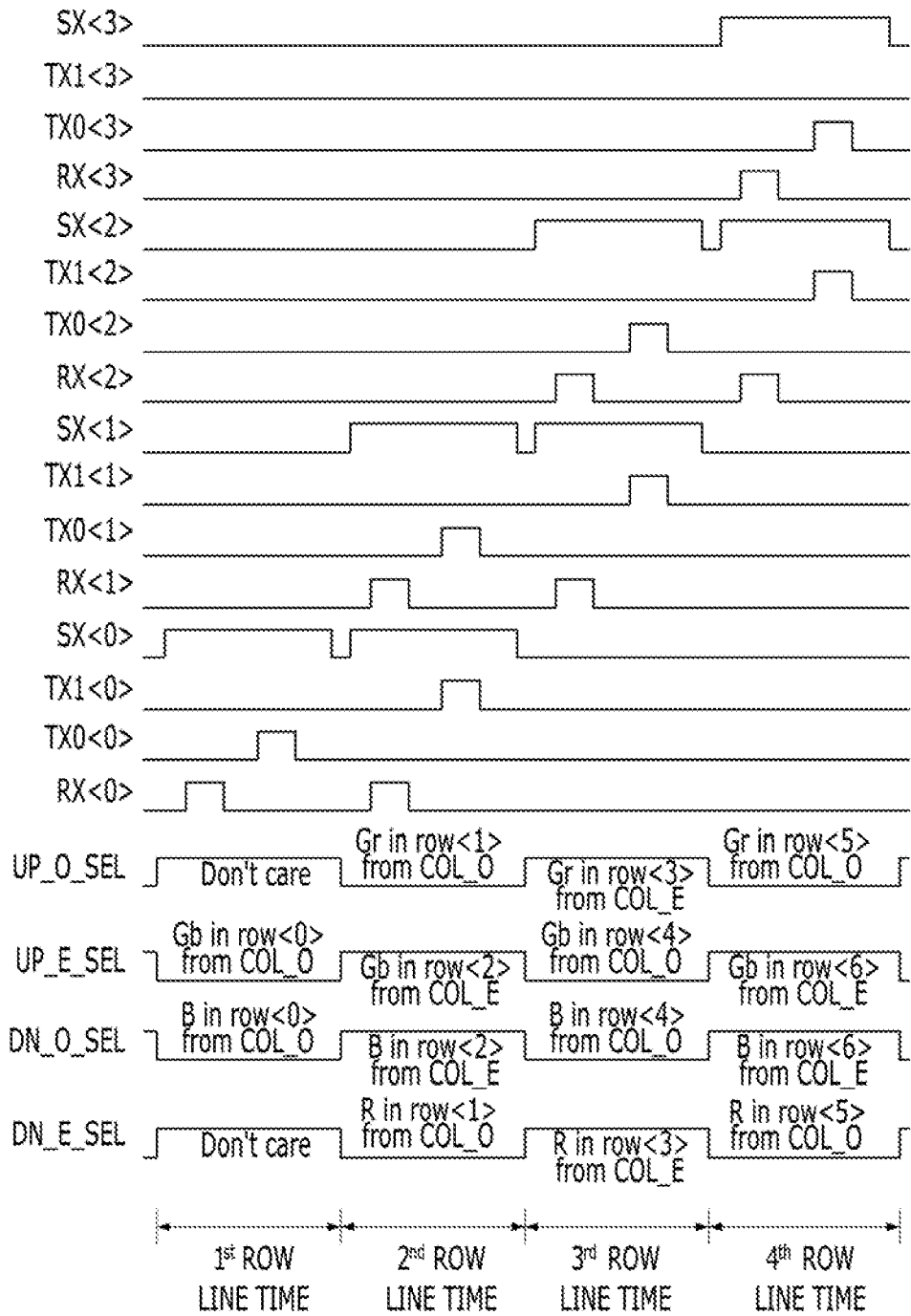
FIG. 15 is a timing diagram illustrating the operation of an image sensing device in accordance with an exemplary embodiment of the present invention.

FIG. 15 is a timing diagram further illustrating the operation of the pixel array 210 and the row control portion 220 shown in FIG. 13, and the operation of the lower readout circuit portion 230 and the upper readout circuit portion 250 shown in FIG. 14.

Referring to FIG. 15, during the first row line time, the pixel signal indicating the blue colour B of the first row ROW<0> may be read out by the lower readout circuit portion 230, and the pixel signal indicating the green colour Gb of the first row ROW<0> may be read out by the upper readout circuit portion 250.

During the second row line time, the pixel signal indicating the red colour R of the second row ROW<1>, and the pixel signal indicating the blue colour B of the third row ROW<2> may be read out by the lower readout circuit portion 230, and the pixel signal indicating the green colour Gr of the second row ROW<1>, and the pixel signal indicating the green colour Gb of the third row ROW<2> may be read out by the upper readout circuit portion 250.

During the third row line time, the pixel signal indicating the red colour R of the fourth row ROW<3>, and the pixel signal indicating the blue colour B of the fifth row ROW<4> may be read out by the lower readout circuit portion 230, and the pixel signal indicating the green colour Gr of the fourth row ROW<3>, and the pixel signal indicating the green colour Gb of the fifth row ROW<4> may be read out by the upper readout circuit portion 250.

During the fourth row line time, the pixel signal indicating the red colour R of the sixth row ROW<5>, and the pixel signal indicating the blue colour B of the seventh row ROW<6> may be read out by the lower readout circuit portion 230, and the pixel signal indicating the green colour Gr of the sixth row ROW<5>, and the pixel signal indicating the green colour Gb of the seventh row ROW<6> may be read out by the upper readout circuit portion 250.

Lastly, although not illustrated, during the fifth row line time, the pixel signal indicating the red colour R of the eighth row ROW<7> may be read out by the lower readout circuit portion 230, and the pixel signal indicating the green colour Gr of the eighth row ROW<7> may be read out by the upper readout circuit portion 250.

Figure 16:
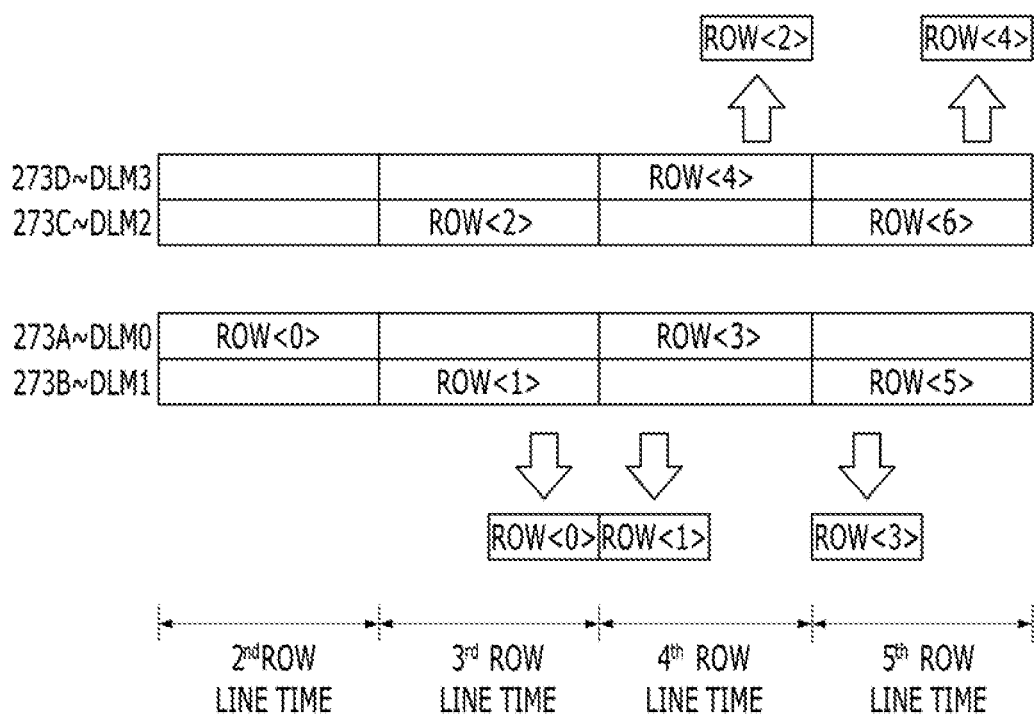
FIG. 16 is a timing diagram illustrating operation of the line memory control unit 271, and the first to fourth line memory units 273A to 273D.

FIG. 16 is a timing diagram illustrating operation of the line memory control unit 271, and the first to fourth line memory units 273A to 273D.

Referring to FIG. 16, during the second row line time, the line memory control unit 271 may store the digital signals of the first row ROW<0>, which are transmitted through the first to fourth channels CH0 to CH3, into the first line memory unit 273A.

During the third row line time, the line memory control unit 271 may store the digital signals of the second row ROW<1>, which are transmitted through the first to fourth channels CH0 to CH3, into the second line memory unit 273B.

During the third row line time, the line memory control unit 271 may store the digital signals of the third row ROW<2>, which are transmitted through the first to fourth channels CH0 to CH3, into the third line memory unit 273C.

During the third row line time, the line memory control unit 271 may control the digital signals of the first row RWO<0>, which are stored in the first line memory unit 273A during the second row line time, to be outputted.

During the fourth row line time, the line memory control unit 271 may store the digital signals of the fourth row ROW<3>, which are transmitted through the first to fourth channels CH0 to CH3, into the first line memory unit 273A.

During the fourth row line time, the line memory control unit 271 may store the digital signals of the fifth row ROW<4>, which are transmitted through the first to fourth channels CH0 to CH3, into the fourth line memory unit 273D.

During the fourth row line time, the line memory control unit 271 may control the digital signals of the second and third rows ROW<1>, and ROW<2>, which are stored in the second and third line memory units 273B, and 273C during the third row line time, to be outputted sequentially in row sequence order.

During the fifth row line time, the line memory control unit 271 may store the digital signals of the sixth row ROW<5>, which are transmitted through the first to fourth channels CH0 to CH3, into the second line memory unit 273B.

During the fifth row line time, the line memory control unit 271 may store the digital signals of the seventh row ROW<6>, which are transmitted through the first to fourth channels CH0 to CH3, into the third line memory unit 273C.

During the fifth row line time, the line memory control unit 271 may control the digital signals of the fourth and fifth rows ROW<3>, and ROW<4>, which are stored in the first and fourth line memory units 273A, and 273D during the fourth row line time, t, to be outputted sequentially in row sequence order.

Although not illustrated, during the sixth row line time, the line memory control unit 271 may store the digital signals of the eighth row ROW<7>, which are transmitted through the first to fourth channels CH0 to CH3, into the fourth line memory unit 273D.

During the sixth row line time, the line memory control unit 271 may control the digital signals of the sixth and seventh rows ROW<5>, and ROW<6>, which are stored in the second and third line memory units 273B, and 273C during the fifth row line time, to be outputted sequentially in row sequence order.

In accordance with the exemplary embodiment of the present invention, when compared with the comparative example described with reference to FIGS. 1 to 8, the image sensing device may read out the pixel signal for each colour through lower and upper readout paths with a reduced number of digital line memories.

Figure 17:
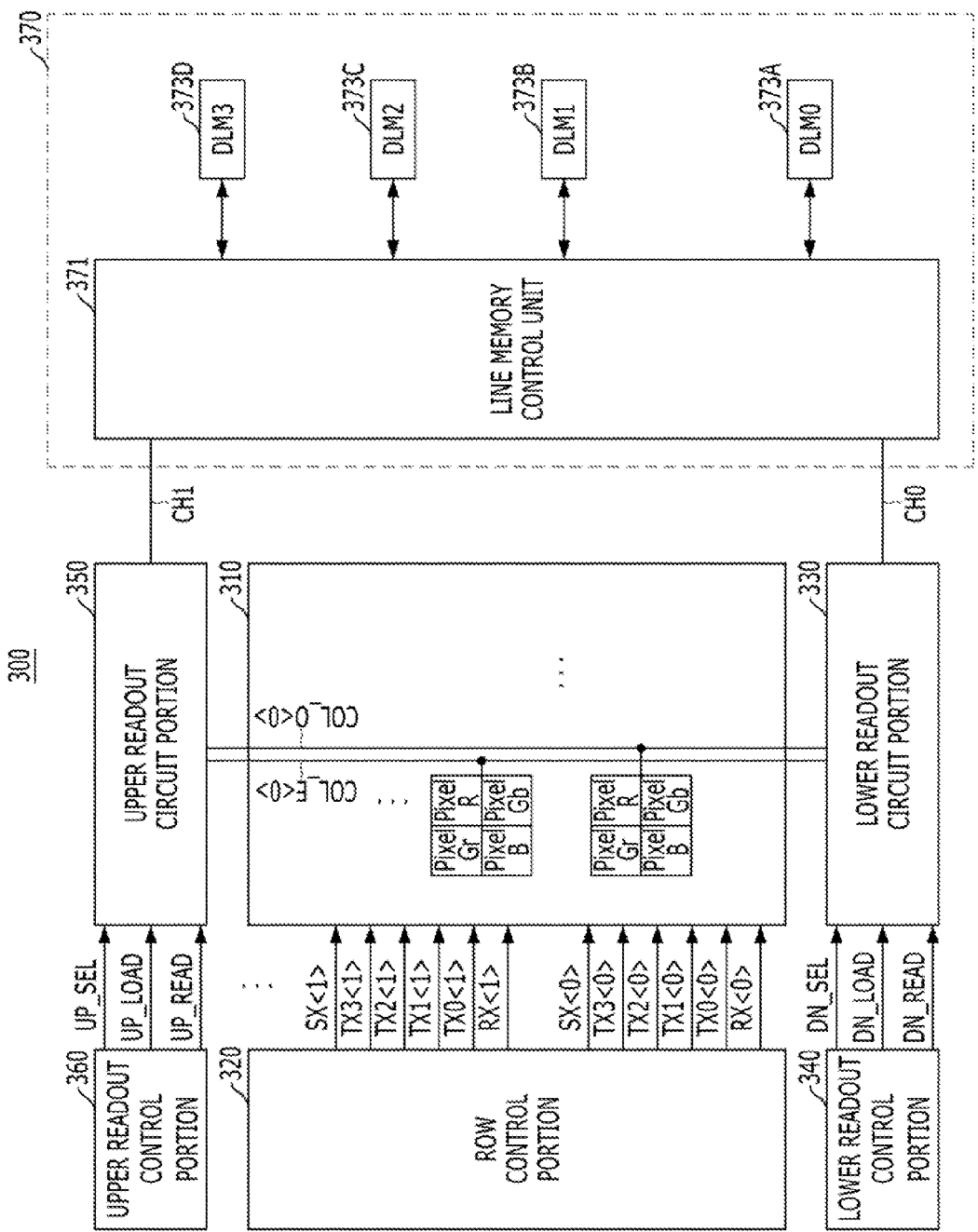
FIG. 17 is a block diagram illustrating an image sensing device in accordance with an exemplary embodiment of the present invention.

FIG. 17 is a block diagram illustrating an image sensing device 300 in accordance with an exemplary embodiment of the present invention.

The repeated cell included in the image sensing device 300 shown in FIG. 17 may be implemented with a 4-shared pixel structure, which is different from the image sensing devices 100 and 200 described above with reference to FIGS. 1 to 16. The image sensing device 300 in accordance with an exemplary embodiment of the present invention will be described with reference to FIGS. 17 to 21 with more emphasis on the difference from the image sensing device 100 described above with reference to FIGS. 1 to 8.

Referring to FIG. 17, the image sensing device 300 may include a pixel array 310, a row control portion 320, a lower readout circuit portion 330, a lower readout control portion 340, an upper readout circuit portion 350, an upper readout control portion 360, and a storage portion 370. The lower readout circuit portion 330 and the upper readout circuit portion 350 may be coupled to the pixel array 310 through a plurality of odd column lines COL_O<0> to COL_O<n>, and a plurality of even column lines COL_E<0> to COL_E<n>. A pair of odd and even column lines may form a column line group. For example, the pair of first odd and even column lines COL_O<0> and COL_E<0> may form a first column group CLG<0>, and the pair of second odd and even column lines COL_O<1> and COL_E<1> may form a second column group CLG<1>.

The pixel array 310 may be arranged in predetermined pattern. For example, the pixel array 310 may be arranged in the Bayer pattern. The Bayer pattern may comprise repeated cells of 2 by 2 pixels, and in each of the repeated cells, 2 pixels of the green colours Gr, and Gb may be arranged in diagonally opposite corners, and a single pixel of the red colour R, and a single pixel of the blue colour B may be arranged in the remaining corners. The 4 pixels arranged in the Bayer pattern in the repeated cell may form a pixel group. The pixel group may be implemented with the 4-shared pixel structure, by which the pixel group shares one of the plurality of odd column lines COL_O<0> to COL_O<n>, or one of the plurality of even column lines COL_E<0> to COLE<n>.

Figure 18:
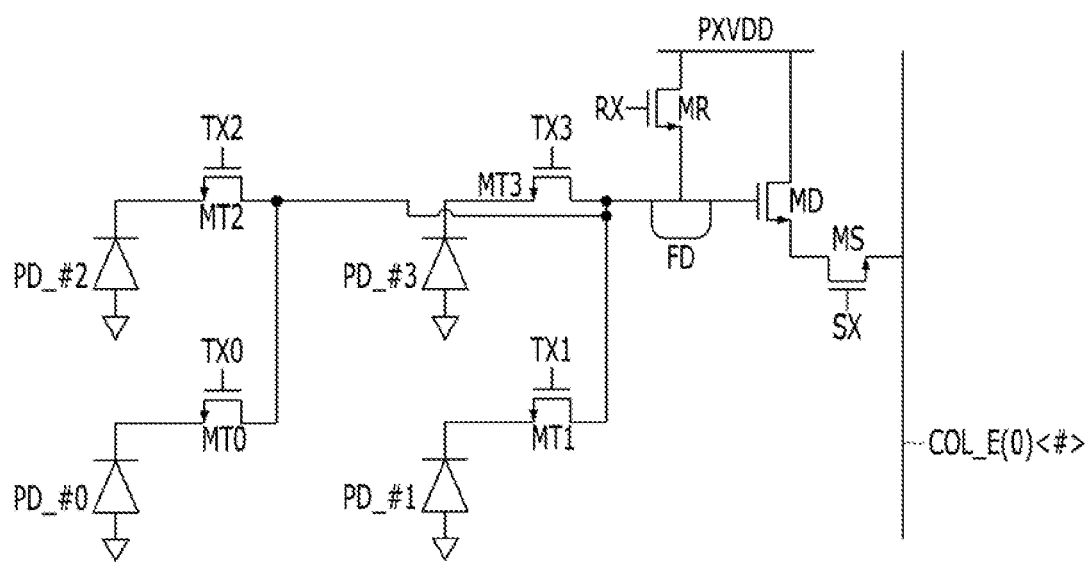
FIG. 18 is a circuit diagram illustrating a pixel group shown in FIG. 17.

FIG. 18 is a circuit diagram illustrating the unit pixel group shown in FIG. 17.

For example, as shown in FIG. 18, 4 photo diodes PD_#0, PD_#1, PD_#2, and PD_#4, which correspond to 4 pixels of the pixel group, respectively, may be electrically coupled to a floating diffusion node FD in common through 4 transmission transistors MT0, MT1, MT2, and MT3 by the 4-shared pixel structure. Also the 4 photo diodes PD_#0, PD_#1, PD_#2, and PD_#4 in the 4-shared pixel structure may share an initialization transistor MR, a driving transistor MD, and a selection transistor MS. The 4-shared pixel structure is well-known.

Referring back to FIG. 17, in the pixel array 310, pairs of odd-ordered and even-ordered pixel groups in the column direction may be electrically coupled to pairs of each of the plurality of odd column lines COL_O<0> to COL_O<n>, and each of the plurality of even column lines COL_E<0> to COLE<n>, respectively.

Figure 19:
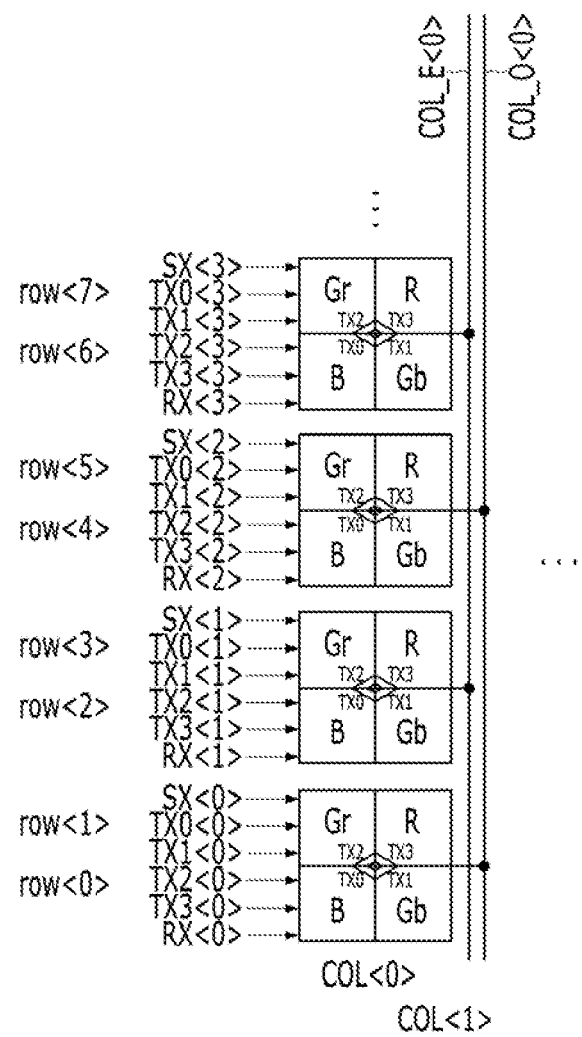
FIG. 19 is a block diagram illustrating a pixel array shown in FIG. 17.

FIG. 19 is a block diagram illustrating the pixel array 310 shown in FIG. 17.

For example, referring to FIG. 19, between the pair of pixel groups, the odd pixel group may be electrically coupled to the plurality of odd column lines COL_O<0> to COL_O<n>, and the even pixel group may be electrically coupled to the plurality of even column lines COL_E<0> to COL_E<n>. All the other pixel groups included in all the other columns may have the same coupling structure. In other words, the odd pixel groups among all of the pixel groups arranged in the column direction may be electrically coupled to odd column lines, for example, the first odd column line COL_O<0>, and the even pixel groups among all of the pixel groups arranged in the column direction may be electrically coupled to even column lines, for example, the first even column line COLE<0>. Further, each of the pixel groups may correspond to a pair of rows. For example, the odd pixel groups may correspond to the pair of the first and second row ROW<0> and ROW<1>, and the pair of the fifth and sixth row ROW<4> and ROW<5>. And the even pixel groups may correspond to the pair of the third and fourth row ROW<2> and ROW<3>, and the pair of the seventh and eighth row ROW<6> and ROW<7>.

Referring back to FIG. 17, the row control portion 320 may control the pair of odd and even pixel groups coupled to the pair of odd and even columns simultaneously, except for the first and last pixel groups of the first row ROW<0> and the last row (not illustrated) of the pixel array 310. For example, the row control portion 320 may control the first pixel groups of the first row ROW<0> to sequentially output the pixel signals per colour through the plurality of odd column lines COL_O<0> to COL_O<n> so that the pixel signals indicating the blue colour B may be outputted at the same time, and then the pixel signals indicating the green colour Gb may be outputted at the same time. Then, the row control portion 320 may simultaneously control the pair of odd and even pixel groups corresponding to the following pairs of rows, to sequentially output the pixel signals per colour through the pairs of plurality of odd and even column lines COL_O<0> to COL_O<n> and COL_E<0> to COL_E<n> so that the pixel signals indicating the red colour R may be outputted, then the pixel signals indicating the green colour Gr may be outputted, and at the same time the pixel signals indicating the blue colour B may be outputted, and then the pixel signals indicating the green colour Gb may be outputted at the same time. And lastly, the row control portion 320 may control the last pixel groups of the last row (not illustrated) to sequentially output the pixel signals per colour through the plurality of even column lines COL_E<0> to COL_E<n> so that the pixel signals indicating the red colour R may be outputted at the same time, and then the pixel signals indicating the green colour Gr may be outputted at the same time.

The lower readout circuit portion 330 may convert the pixel signals in parallel, which are transmitted alternately through the plurality of odd column lines COL_O<0> to COL_O<n>, and the plurality of even column lines COLE<0> to COLE<n>, into the pixel signals in series, and transmit the pixel signals in series to the storage portion 370.

Figure 20:
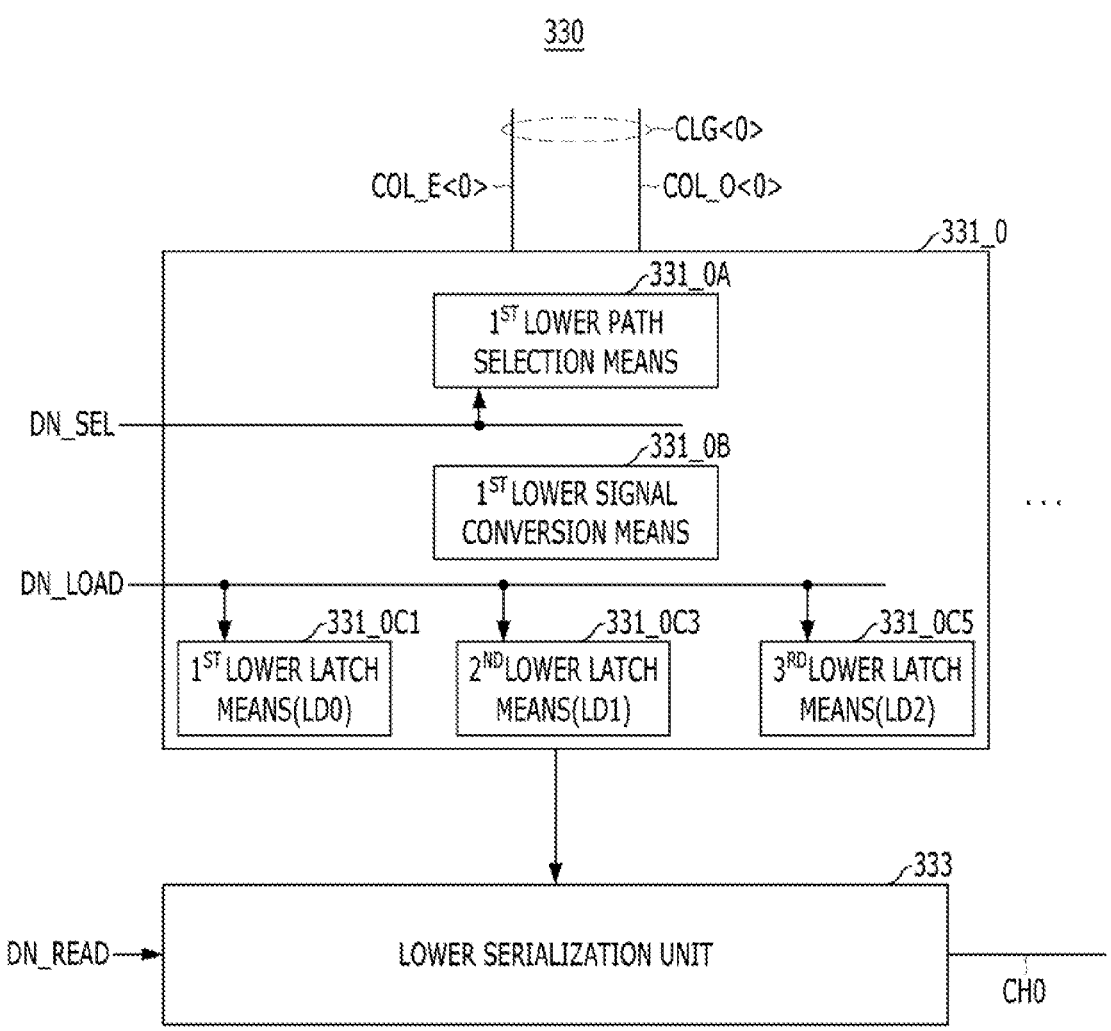
FIG. 20 is a block diagram illustrating a lower readout circuit portion shown in FIG. 17.

FIG. 20 is a block diagram illustrating the lower readout circuit portion 330 shown in FIG. 17.

For example, as shown in FIG. 20, the lower readout circuit portion 230 may include a plurality of lower readout units 331_0 to 331_n, and a lower serialization unit 333. The plurality of lower readout units 331_0 to 331_n may correspond to the plurality of column line groups CLG<0> to CLG<n>, respectively. The plurality of lower readout units 331_0 to 331_n may convert the pixel signals, which are alternately transmitted through the plurality of odd column lines COL_O<0> to COL_O<n> and the plurality of even column lines COL_E<0> to COL_E<n>, into the lower digital signals. The lower serialization unit 333 may serialize the lower digital signals outputted from the plurality of lower readout units 331_0 to 331_n, and may output the serialized lower digital signals on row by row basis.

The plurality of lower readout units 331_0 to 331_n may be the same as each other. A first lower readout unit 331_0 of the plurality of lower readout units 331_0 to 331_n will be described.

The first lower readout unit 331_0 may include a first lower path selection means 331_0A, a first lower signal conversion means 331_0B, and first to third lower latch means 331_0C1, 331_0C3, and 331_0C5. The first lower path selection means 331_0A may alternately select one of the first odd column line COL_O<0>, and the first even column line COL_E<0> of the first column group CLG<0> in response to a lower selection signal DN_SEL at every half of the row line time. The first lower signal conversion means 331_0B may convert the pixel signal transmitted through the first lower path selection means 331_0A into the first lower digital signal. The first to third lower latch means 331_0C1, 331_0C3, and 331_0C5 may sequentially latch the first lower digital signal, which is transmitted at every half of the unit row line time, in response to a lower latch signal DN_LOAD.

The first lower path selection means 331_0A may alternately select one of the first odd column line COL_O<0>, and the first even column line COL_E<0> of the first column group CLG<0> according to a logic level of the lower selection signal DN_SEL. The first lower signal conversion means 331_0B may include an analogue to digital converter (ADC). Each of the first to third lower latch means 331_0C1, 331_0C3, and 331_0C5 may include a register-type latch for latching multi-bits of the first lower digital signal.

The lower serialization unit 333 may sequentially output on row by row basis the lower digital signals, which are outputted from the plurality of lower readout units 331_0 to 331_n, through a first channel CH0 in response to a lower read signal DN_READ. The lower serialization unit 333 may sequentially output on row by row basis the lower digital signals through two or more of channels.

Referring to FIGS. 17 and 20, the lower readout control portion 340 may generate the lower selection signal DN_SEL for controlling the plurality of lower path selection means 331_0A, a lower latch signal DN_LOAD for controlling the plurality of first to third lower latch means 331_0C1, 331_0C3, and 331_0C5 to latch in a predetermined order the lower digital signals outputted from the plurality of lower signal conversion means 331_0B, and a lower read signal DN_READ for controlling the lower serialization unit 333 to sequentially output on row by row basis the lower digital signals latched by the plurality of first to third lower latch means 331_0C1, 331_0C3, and 331_0C5.

The upper readout circuit portion 350 may convert the pixel signals in parallel, which are transmitted alternately through the plurality of odd column lines COL_O<0> to COL_O<n>, and the plurality of even column lines COL_E<0> to COL_E<n>, into the pixel signals in series, and transmit the pixel signals in series to the storage portion 370.

Figure 21:
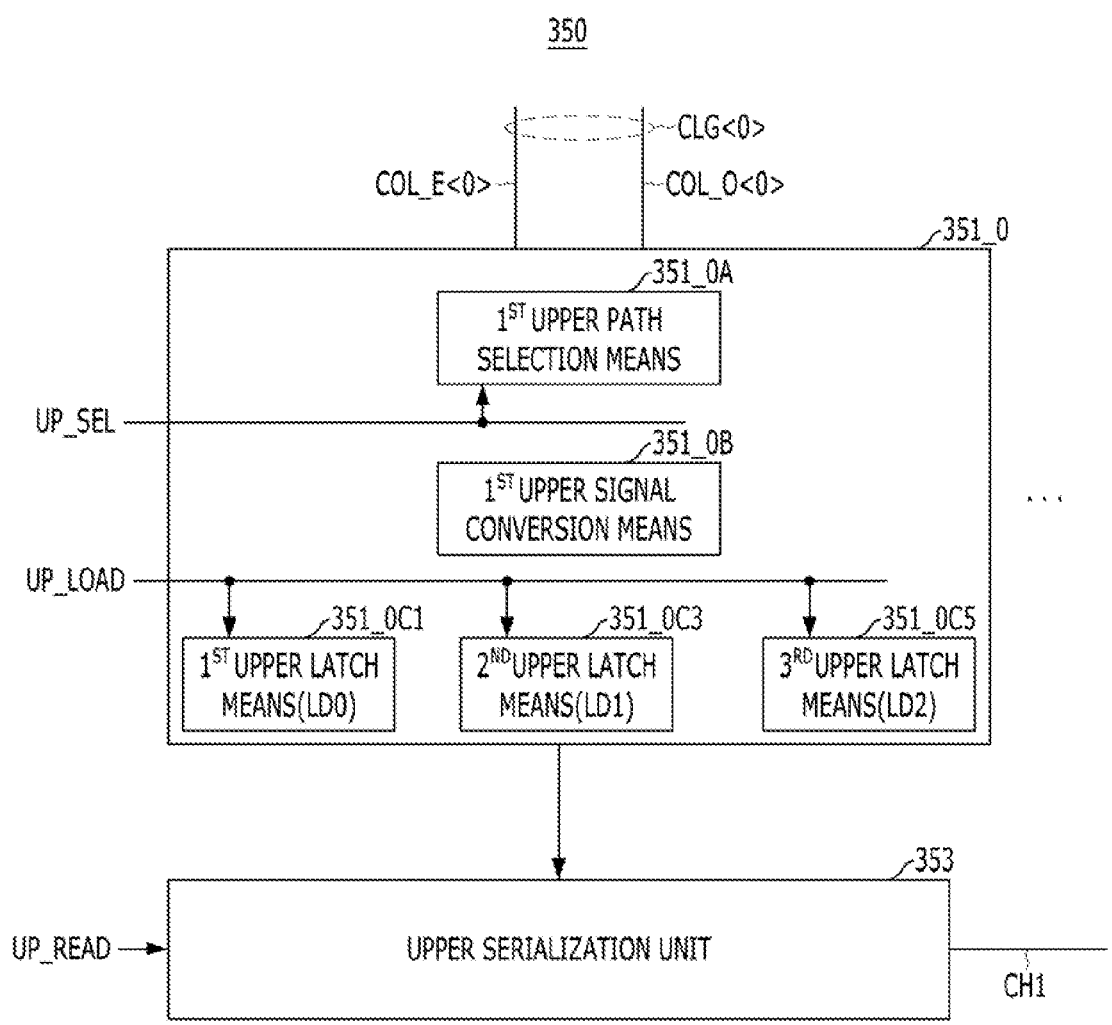
FIG. 21 is a block diagram illustrating an upper readout circuit portion shown in FIG. 17.

FIG. 21 is a block diagram illustrating the upper readout circuit portion 350 shown in FIG. 17.

For example, as shown in FIG. 21, the upper readout circuit portion 350 may include a plurality of upper readout units 351_0 to 351_n, and an upper serialization unit 353. The plurality of upper readout units 351_0 to 351_n may correspond to the plurality of column groups CLG<0> to CLG<n>, respectively. The plurality of upper readout units 351_0 to 351_n may convert the pixel signals, which are alternately transmitted through the plurality of odd column lines COL_O<0> to COL_O<n> and the plurality of even column lines COL_E<O> to COL_E<n>, into the upper digital signals. The upper serialization unit 353 may serialize the upper digital signals outputted from the plurality of upper readout units 351_0 to 351_n, and may output the serialized upper digital signals on row by row basis.

The plurality of upper readout units 351_0 to 351_n may be the same as each other. A first upper readout unit 351_0 of the plurality of upper readout units 351_0 to 351_n will be described.

The first upper readout unit 351_0 may include a first upper path selection means 351_0A, a first upper signal conversion means 351_0B, and first to third upper latch means 351_0C1, 351_0C3, and 351_0C5. The first upper path selection means 351_0A may alternately select one of the first odd column line COL_O<0>, and the first even column line COL_E<0> of the first column group CLG<0> in response to a first upper selection signal UP_SEL at every half of the unit row line time. The first upper signal conversion means 351_0B may convert the pixel signal transmitted through the first upper path selection means 351_0A into the first upper digital signal. The first to third upper latch means 351_0C1, 351_0C3, and 351_0C5 may sequentially latch the first upper digital signal, which is sequentially transmitted at every half of the unit row line time, in response to an upper latch signal UP_LOAD.

The first upper path selection means 351_0A may alternately select one of the first odd column line COL_O<0>, and the first even column line COL_E<0> of the first column group CLG<0> according to a logic level of the upper selection signal UP_SEL. The first upper signal conversion means 351_0B may include an analogue to digital converter (ADC). Each of the first to third upper latch means 351_0C1, 351_0C3, and 351_0C5 may include a register-type latch for latching multi-bits of the first upper digital signal.

The lower path selection means of the plurality of lower readout units 331_0 to 331_n, and the upper path selection means of the plurality of upper readout units 351_0 to 351_n may select different lines between the odd and even column lines of corresponding column groups. For example, during the half of the row line time, when the first lower path selection means 331_0A selects the first odd column line COL_O<0> of the first column group CLG<0>, the first upper path selection means 351_0A may select the first even column line COL_E<0> of the first column group CLG<0>. Conversely, during the half of the unit row line time, when the first lower path selection means 331_0A selects the first even column line COL_E<0> of the first column group CLG<0>, the first upper path selection means 351_0A may select the first odd column line COL_O<0> of the first column group CLG<0>.

The upper serialization unit 333 may sequentially output on row by row basis the upper digital signals, which are outputted from the plurality of upper readout units 351_0 to 351_n, through a second channel CH1 in response to an upper read signal UP_READ. The upper serialization unit 333 may sequentially output on row by row basis the upper digital signals through two or more of the channels.

Referring to FIGS. 17 and 21, the upper readout control portion 360 may generate the upper selection signal UP_SEL for controlling the plurality of upper path selection means 351_0A, an upper latch signal UP_LOAD for controlling the plurality of first to third upper latch means 351_0C1, 351_0C3, and 351_0C5 to latch in a predetermined order the upper digital signals outputted from the plurality of upper signal conversion means 351_0B, and an upper read signal UP_READ for controlling the upper serialization unit 353 to sequentially output on row by row basis the upper digital signals latched by the plurality of first to third upper latch means 351_0C1, 351_0C3, and 351_0C5.

The lower readout control portion 340, and the upper readout control portion 360 may generate the lower selection signal DN_SEL, and the upper selection signal UP_SEL, which are alternately toggling.

The storage portion 370 may include first to fourth line memory units 373A to 373D, and a line memory control unit 371. The first to fourth line memory units 373A to 373D may store lower digital signals outputted from the lower readout circuit portion 330, and upper digital signals outputted from the upper readout circuit portion 350 in row sequence order, and may output the lower and upper digital signals in row sequence order. The line memory control unit 271 may control the first to fourth line memory units 373A to 373D.

The line memory control unit 371 may control the first to fourth line memory units 373A to 373D to store on row by row basis the lower digital signals and the upper digital signals transmitted through the first and second channels CH0, and CH1, and to sequentially output the lower and upper digital signals, which are stored in the first to fourth line memory units 373A to 373D on row by row basis, in row sequence order.

Each of the first to fourth line memory units 373A to 373D may store the digital signals transmitted on row by row basis. For example, the first line memory unit 373A may store the digital signals corresponding to the first row ROW<0>, and the second line memory unit 373B may store the digital signals corresponding to the second row ROW<1>. Each of the first to fourth line memory units 373A to 373D may include a digital line memory (DLM).

FIGS. 22 to 25 are timing diagrams illustrating operation of the image sensing device 300 in accordance with an exemplary embodiment of the present invention. Operation of the image sensing device 300 will be described with reference to FIGS. 22 to 25.

Figure 22:
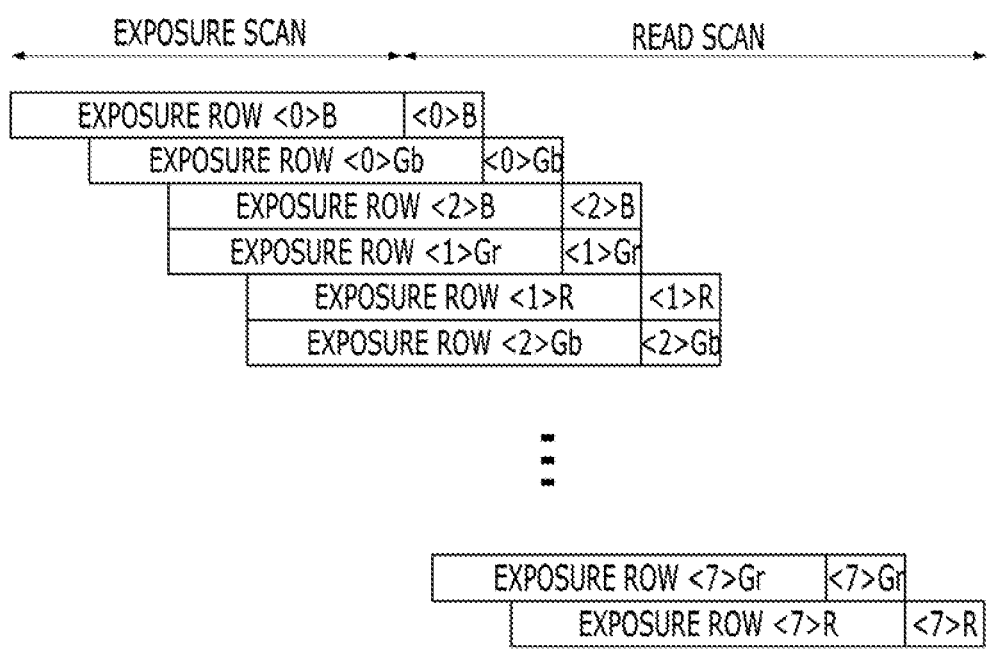
FIG. 22 is a timing diagram illustrating the operation of an image sensing device in accordance with an exemplary embodiment of the present invention.

FIG. 22 is a timing diagram illustrating operation of the pixel array 310 and the row control portion 320.

As described above, the row control portion 320 may control the pair of odd and even pixel groups coupled to the pair of odd and even columns simultaneously, except for the first and last pixel groups of the first row ROW<0> and the last row of the pixel array 310, for example, the eighth row ROW<7> of the pixel array 210.

Referring to FIG. 22, the row control portion 320 may control the pixel array 310 by the unit of a single row, or by the unit of 2 rows respectively corresponding to the pair of odd and even pixel groups. For example, the row control portion 320 may control the first pixel groups of the first row ROW<0> to sequentially output the pixel signals per colour through the plurality of odd column lines COL_O<0> to COL_O<n> so that the pixel signals indicating the blue colour B may be outputted at the same time, and then the pixel signals indicating the green colour Gb may be outputted at the same time. Then, the row control portion 320 may simultaneously control the pair of odd and even pixel groups corresponding to the following pairs of second and third rows ROW<1> and ROW<2>, to sequentially output the pixel signals per colour through the pairs of the plurality of odd and even column lines COL_O<0> to COL_O<n> and COLE<0> to COLE<n> so that the pixel signals indicating the red colour R and the pixel signals indicating the green colour Gr may be sequentially outputted, and at the same time, the pixel signals indicating the blue colour B and the pixel signals indicating the green colour Gb may be sequentially outputted. Then, the row control portion 320 may simultaneously control the pair of odd and even pixel groups corresponding to the following pairs of fourth and fifth rows ROW<3> and ROW<4>, and then the pair of odd and even pixel groups corresponding to the following pairs of sixth and seventh rows ROW<5> and ROW<6> in the same way. And lastly, the row control portion 320 may control the last pixel groups of the eighth row ROW<7> to sequentially output the pixel signals per colour through the plurality of even column lines COL_E<0> to COL_E<n> so that the pixel signals indicating the red colour R and the pixel signals indicating the green colour Gr may be sequentially outputted. The exposure sequence may be the same as the readout sequence.

FIG. 23 is a timing diagram illustrating operation of the lower readout circuit portion 330 and the upper readout circuit portion 350. FIG. 23 shows the pixel signals corresponding only to the first to eighth rows ROW<0> to ROW<7>, and the first and second columns COL<0>, and COL<1>, and shows the pixel signals as blocks. In this example, the first and eighth rows ROW<0> and ROW<7> are the first and last rows, respectively.

As described above, the pixel signals are readout on row by row basis, and each of the odd and even pixel groups may correspond to the pair of rows. Also, the lower readout circuit portion 330 may sequentially read out the pixel signals of the pair of pixels arranged in diagonally opposite corners of the repeated cell of the pixel array 310, and at the same time, the upper readout circuit portion 350 may sequentially read out the pixel signals of the remaining pair of pixels arranged in diagonally opposite corners of the repeated cell of the pixel array 310. Further, the pixel signals of the 2 pairs of diagonally opposite pixels of the repeated cell of the pixel array 310 are read out simultaneously. Accordingly, the pixel signals are sequentially read out on row by row basis, and read out simultaneously by the 2 pairs of diagonally opposite pixels of the repeated cell of the pixel array 210.

Referring to FIG. 23, the lower readout circuit portion 330 may read out the pixel signals in order of the first row ROW<0>, the pair of the second and third rows ROW<1> and ROW<2>, the pair of the fourth and fifth rows ROW<3> and ROW<4>, the pair of the sixth and seventh rows ROW<5> and ROW<6>, and the eighth row ROW<7>. The pixel signals to be read out by the lower readout circuit portion 330 may be the pair of diagonally opposite pixels of the repeated cell of the pixel array 310. The pixel signals to be read out by the upper readout circuit portion 350 may be the remaining pair of diagonally opposite pixels of the repeated cell of the pixel array 210.

Operation of the lower readout circuit portion 330 will be described.

During a first half of a first row line time, the first odd lower readout unit 331_0 may read out the pixel signal indicating the blue colour B in the pixel signals of the first row ROW<0>. In detail, the first lower path selection means 331_0A during the first half of the first row line time may select the first odd column line COL_O<0>, the first lower signal conversion means 331_0B may convert the pixel signal indicating the blue colour B in the pixel signals of the first row ROW<0> into digital signals, and the first lower latch means 331_0C1 may latch the converted digital signals corresponding to the pixel signal indicating the blue colour B in the pixel signals of the first row ROW<0>.

During a second half of the first row line time, the first lower readout unit 331_0 may be in a DON'T CARE state, and may not receive any pixel signal.

During a first half of a second row line time, the first lower readout unit 331_0 may read out the pixel signal indicating the blue colour B in the pixel signals of the third row ROW<2>. In detail, the first lower path selection means 331_0A during the first half of the second row line time may select the first even column line COL_E<0>, the first lower signal conversion means 331_08B may convert the pixel signal indicating the blue colour B in the pixel signals of the third row ROW<2> into digital signals, and the second lower latch means 331_0C3 may latch the converted digital signals corresponding to the pixel signal indicating the blue colour B in the pixel signals of the third row ROW<2>.

During a second half of the second row line time, the first lower readout unit 331_0 may read out the pixel signal indicating the red colour R in the pixel signals of the second row ROW<1>. In detail, the first lower path selection means 331_0A during the second half of the second row line time may select the first odd column line COL_O<0>, the first lower signal conversion means 331_08 may convert the pixel signal indicating the red colour R in the pixel signals of the second row ROW<1> into digital signals, and the third lower latch means 331_0C5 may latch the converted digital signals corresponding to the pixel signal indicating the red colour R in the pixel signals of the second row ROW<1>.

During a first half of a third row line time, the first lower readout unit 331_0 may read out the pixel signal indicating the blue colour B in the pixel signals of the fifth row ROW<4>. In detail, the first lower path selection means 331_0A during the first half of the third row line time may select the first odd column line COL_O<0>, the first lower signal conversion means 331_0B may convert the pixel signal indicating the blue colour B in the pixel signals of the fifth row ROW<4> into digital signals, and the first lower latch means 331_0C1 may latch the converted digital signals corresponding to the pixel signal indicating the blue colour B in the pixel signals of the fifth row ROW<4>.

During the first half of the third row line time, the digital signals, which correspond to the pixel signals of the first row ROW<0>, and are latched in the first lower latch means 331_0C1 during the first half of the first row line time, may be outputted to the first channel CH0 by the lower serialization unit 333 before the digital signals corresponding to the pixel signals of the fifth row ROW<4> are latched into the first lower latch means 331_0C1.

During a second half of the third row line time, the first lower readout unit 331_0 may read out the pixel signal indicating the red colour R in the pixel signals of the fourth row ROW<3>. In detail, the first lower path selection means 331_0A during the second half of the third row line time may select the first even column line COL_E<0>, the first lower signal conversion means 331_0B may convert the pixel signal indicating the red colour R in the pixel signals of the fourth row ROW<3> into digital signals, and the third lower latch means 331_0C5 may latch the converted digital signals corresponding to the pixel signal indicating the red colour R in the pixel signals of the fourth row ROW<3>.

During the second half of the third row lime time, the digital signals, which correspond to the pixel signals of the second row ROW<1> and are latched in the third lower latch means 331_0C5 during the second half of the first row line time, may be outputted to the first channel CH0 by the lower serialization unit 333 before the digital signals corresponding to the pixel signals of the fourth row ROW<3> are latched into the third lower latch means 331_0C5.

During a first half of a fourth row line time, the first lower readout unit 331_0 may read out the pixel signal indicating the blue colour B in the pixel signals of the seventh row ROW<6>. In detail, the first lower path selection means 331_0A during the first half of the fourth row line time may select the first even column line COL_E<0>, the first lower signal conversion means 331_0B may convert the pixel signal indicating the blue colour B in the pixel signals of the seventh row ROW<6> into digital signals, and the second lower latch means 331_0C3 may latch the converted digital signals corresponding to the pixel signal indicating the blue colour B in the pixel signals of the seventh row ROW<6>.

During the first half of the fourth row line time, the digital signals, which correspond to the pixel signals of the third row ROW<2>, and are latched in the second lower latch means 331_0C3 during the first half of the second row line time, may be outputted to the first channel CH0 by the lower serialization unit 333 before the digital signals corresponding to the pixel signals of the seventh row ROW<6> are latched into the first lower latch means 331_0C1.

During a second half of the fourth row line time, the first lower readout unit 331_0 may read out the pixel signal indicating the red colour R in the pixel signals of the sixth row ROW<5>. In detail, the first lower path selection means 331B_1 during the second half of the fourth row line time may select the first odd column line COL_O<0>, the first lower signal conversion means 331_0B may convert the pixel signal indicating the red colour R in the pixel signals of the sixth row ROW<5> into digital signals, and the third lower latch means 331_0C5 may latch the converted digital signals corresponding to the pixel signal indicating the red colour R in the pixel signals of the sixth row ROW<5>.

During the second half of the fourth row line time, the digital signals, which correspond to the pixel signals of the fourth row ROW<3> and are latched in the third lower latch means 331_0C5 during the second half of the third row line time, may be outputted to the first channel CH0 by the lower serialization unit 333 before the digital signals corresponding to the pixel signals of the sixth row ROW<5> are latched into the third lower latch means 331_0C5.

During a first half of a fifth row line time, the first lower readout unit 331_0 may be in the DON'T CARE state.

During the first half of the fifth row line time, the digital signals, which correspond to the pixel signals of the seventh row ROW<6> and are latched in the second lower latch means 331_0C3 during the first half of the fourth row line time, may be outputted to the first channel CH0 by the lower serialization unit 333.

During a second half of the fifth row line time, the first lower readout unit 331_0 may read out the pixel signal indicating the red colour R in the pixel signals of the eighth row ROW<7>. In detail, the first lower path selection means 331_0A during the second half of the fifth row line time may select the first even column line COL_E<0>, the first lower signal conversion means 331_0B may convert the pixel signal indicating the red colour R in the pixel signals of the eighth row ROW<7> into digital signals, and the third lower latch means 331_0C5 may latch the converted digital signals corresponding to the pixel signal indicating the red colour R in the pixel signals of the eighth row ROW<7>.

During the second half of the fifth row line time, the digital signals, which correspond to the pixel signals of the sixth row ROW<5>, and are latched in the third lower latch means 331_0C5 during the second half of the fourth row line time, may be outputted to the first channel CH0 by the lower serialization unit 333 before the digital signals corresponding to the pixel signals of the eighth row ROW<7> are latched into the third lower latch means 331_0C5.

Operation of the upper readout circuit portion 350 will be described.

During the first half of the first row line time, the first upper readout unit 351_0 may be in a DON'T CARE state, and may not receive any pixel signal.

During the second half of the first row time, the first upper readout unit 351_0 may read out the pixel signal indicating the green colour Gb in the pixel signals of the first row ROW<0>. In detail, the first upper path selection means 351_0A during the second half of the first row line time may select the first odd column line COL_O<0>, the first upper signal conversion means 351_0B may convert the pixel signal indicating the green colour Gb in the pixel signals of the first row ROW<0> into digital signals, and the first upper latch means 351_0C1 may latch the converted digital signals corresponding to the pixel signal indicating the green colour Gb in the pixel signals of the first row ROW<0>.

During the first half of the second row line time, the first upper readout unit 351_0 may read out the pixel signal indicating the green colour Gb in the pixel signals of the second row ROW<1>. In detail, the first upper path selection means 351_0A during the first half of the second row line time may select the first odd column line COL_O<0>, the first upper signal conversion means 351_0B may convert the pixel signal indicating the green colour Gr in the pixel signals of the second row ROW<1> into digital signals, and the second upper latch means 351_0C3 may latch the converted digital signals corresponding to the pixel signal indicating the green colour Gr in the pixel signals of the second row ROW<1>.

During the second half of the second row line time, the first upper readout unit 351_0 may read out the pixel signal indicating the green colour Gb in the pixel signals of the third row ROW<2>. In detail, the first upper path selection means 351_0A during the second half of the second row line time may select the first even column line COL_E<0>, the first upper signal conversion means 351_0B may convert the pixel signal indicating the green colour Gb in the pixel signals of the first row ROW<0> into digital signals, and the third upper latch means 351_0C5 may latch the converted digital signals corresponding to the pixel signal indicating the green colour Gb in the pixel signals of the third row ROW<2>.

During the first half of the third row line time, the first upper readout unit 351_0 may read out the pixel signal indicating the green colour Gr in the pixel signals of the fourth row ROW<3>. In detail, the first upper path selection means 351_0A during the first half of the third row line time may select the first even column line COL_E<0>, the first upper signal conversion means 351_0B may convert the pixel signal indicating the green colour Gr in the pixel signals of the fourth row ROW<3> into digital signals, and the first upper latch means 351_0C1 may latch the converted digital signals corresponding to the pixel signal indicating the green colour Gr in the pixel signals of the fourth row ROW<3>.

During the first half of the third row line time, the digital signals, which correspond to the pixel signals of the first row ROW<0>, and are latched in the first upper latch means 351_0C1 during the second half of the first row line time, may be outputted to the second channel CH1 by the upper serialization unit 353 before the digital signals corresponding to the pixel signals of the fourth row ROW<3> are latched into the first upper latch means 351_0C1.

During the second half of the third row line time, the first upper readout unit 351_0 may read out the pixel signal indicating the green colour Gb in the pixel signals of the fifth row ROW<4>. In detail, the first upper path selection means 351_0A during the second half of the third row line time may select the first odd column line COL_O<0>, the first upper signal conversion means 351_0B may convert the pixel signal indicating the green colour Gb in the pixel signals of the fifth row ROW<4> into digital signals, and the second upper latch means 351_0C3 may latch the converted digital signals corresponding to the pixel signal indicating the green colour Gb in the pixel signals of the fifth row ROW<4>.

During the second half of the third row line time, the digital signals, which correspond to the pixel signals of the second row ROW<1>, and are latched in the second upper latch means 351_0C3 during the first half of the second row line time, may be outputted to the second channel CH1 by the upper serialization unit 353 before the digital signals corresponding to the pixel signals of the fifth row ROW<4> are latched into the second upper latch means 351_0C3.

During the first half of the fourth row line time, the first upper readout unit 351_0 may read out the pixel signal indicating the green colour Gr in the pixel signals of the sixth row ROW<5>. In detail, the first upper path selection means 351_0A during the first half of the fourth row line time may select the first odd column line COL_O<0>, the first upper signal conversion means 351_0B may convert the pixel signal indicating the green colour Gr in the pixel signals of the sixth row ROW<5> into digital signals, and the third upper latch means 351_0C5 may latch the converted digital signals corresponding to the pixel signal indicating the green colour Gr in the pixel signals of the sixth row ROW<5>.

During the first half of the fourth row line time, the digital signals, which correspond to the pixel signals of the third row ROW<2>, and are latched in the third upper latch means 351_0C5 during the second half of the second row line time, may be outputted to the second channel CH1 by the upper serialization unit 353 before the digital signals corresponding to the pixel signals of the sixth row ROW<5> are latched into the third upper latch means 351_0C5.

During the second half of the fourth row line time, the first upper readout unit 351_0 may read out the pixel signal indicating the green colour Gb in the pixel signals of the seventh row ROW<6>. In detail, the first upper path selection means 351_0A during the second half of the fourth row line time may select the first even column line COL_O<0>, the first upper signal conversion means 351_0B may convert the pixel signal indicating the green colour Gb in the pixel signals of the seventh row ROW<6> into digital signals, and the first upper latch means 351_0C1 may latch the converted digital signals corresponding to the pixel signal indicating the green colour Gb in the pixel signals of the seventh row ROW<6>.

During the second half of the fourth row line time, the digital signals, which correspond to the pixel signals of the fourth row ROW<3>, and are latched in the first upper latch means 351_0C1 during the first half of the third row line time, may be outputted to the second channel CH1 by the upper serialization unit 353 before the digital signals corresponding to the pixel signals of the seventh row ROW<6> are latched into the first upper latch means 351_0C1.

During the first half of the fifth row line time, the first upper readout unit 351_0 may read out the pixel signal indicating the green colour Gr in the pixel signals of the eighth row ROW<7>. In detail, the first upper path selection means 351_0A during the first half of the fifth row line time may select the first even column line COL_E<0>, the first upper signal conversion means 351_0B may convert the pixel signal indicating the green colour Gr in the pixel signals of the eighth row ROW<7> into digital signals, and the second upper latch means 351_0C3 may latch the converted digital signals corresponding to the pixel signal indicating the green colour Gr in the pixel signals of the eighth row ROW<7>.

During the first half of the fifth row line time, the digital signals, which correspond to the pixel signals of the fifth row ROW<4>, and are latched in the second upper latch means 351_0C3 during the second half of the third row line time, may be outputted to the second channel CH1 by the upper serialization unit 353 before the digital signals corresponding to the pixel signals of the eighth row ROW<7> are latched into the second upper latch means 351_0C3.

During the second half of the fifth row line time, the first upper readout unit 351_0 may be in the DON'T CARE state.

Figure 24A:
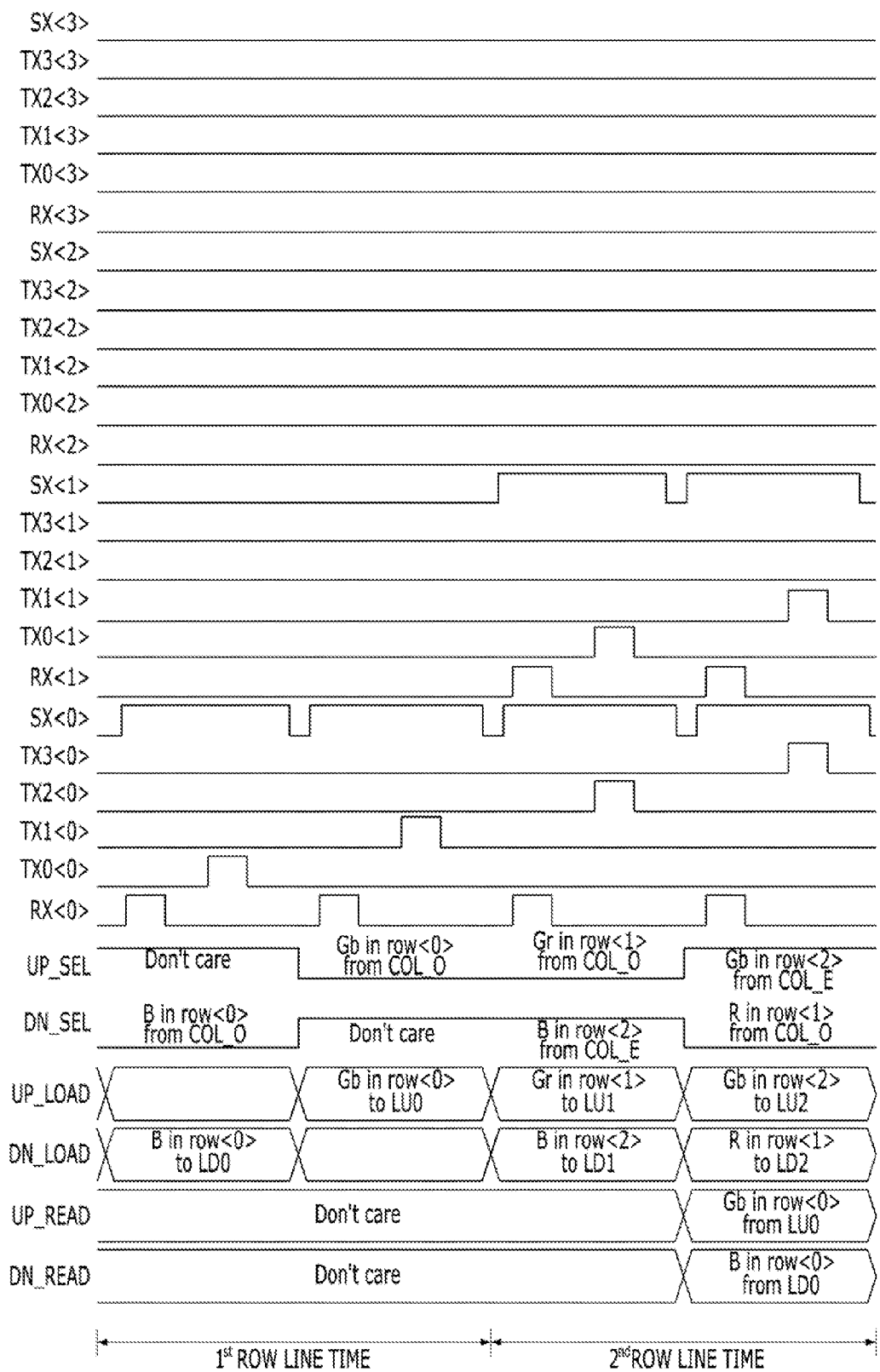
FIGS. 24A and 24B are timing diagrams illustrating the operation of an image sensing device in accordance with an exemplary embodiment of the present invention.
Figure 24B:
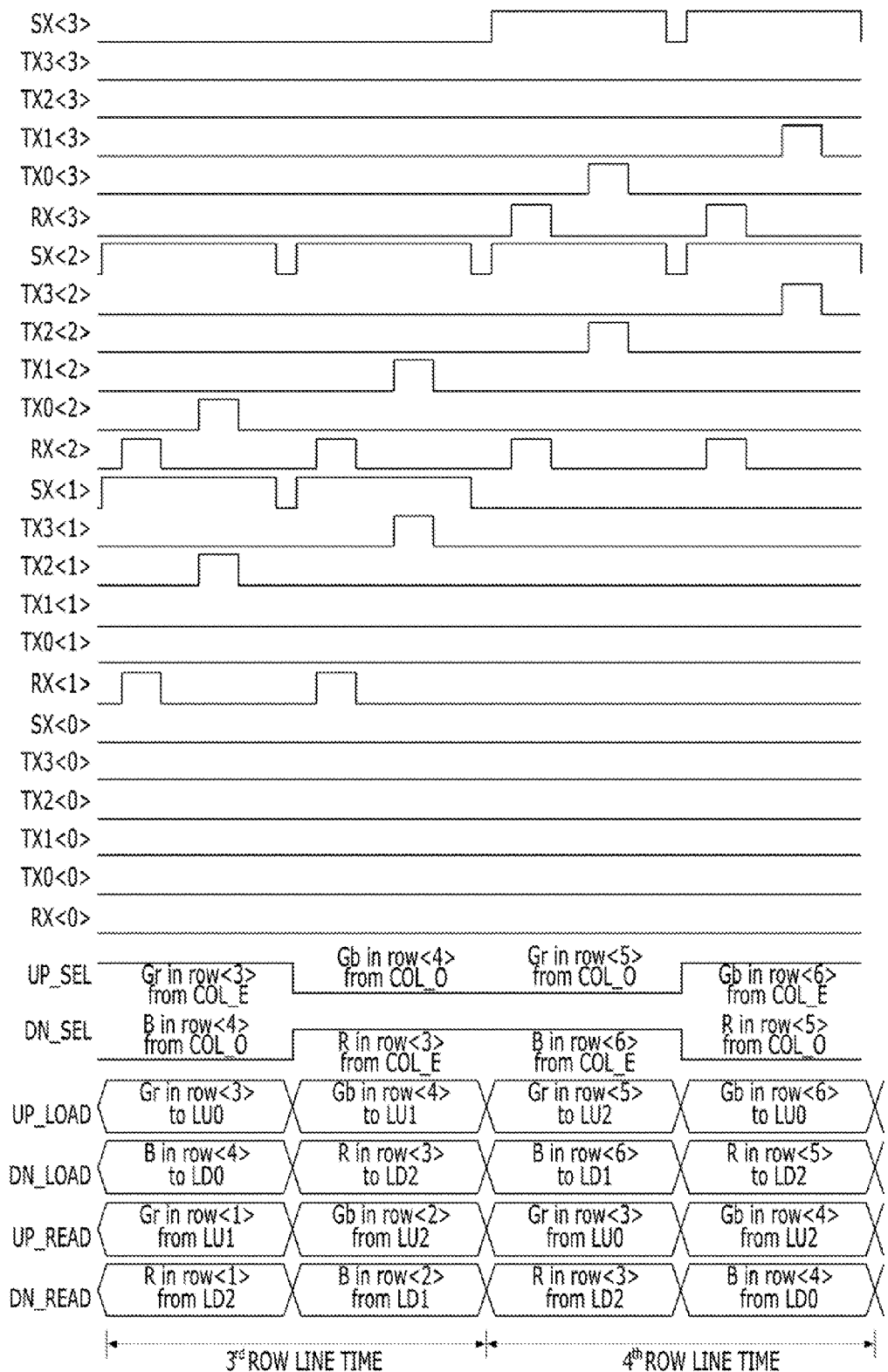

FIGS. 24A and 24B are timing diagrams further illustrating the operation of the pixel array 310 and the row control portion 320 shown in FIG. 22, and the operation of the lower readout circuit portion 330 and the upper readout circuit portion 350 shown in FIG. 23.

Referring to FIG. 24A, during the first half of the first row line time, the pixel signal indicating the blue colour B in the pixel signals of the first row ROW<0> may be read out by the lower readout circuit portion 330.

During the second half of the first row line time, the pixel signal indicating the green colour Gb in the pixel signals of the first row ROW<0> may be read out by the upper readout circuit portion 350.

During the first half of the second row line time, the pixel signal indicating the green colour Gr in the pixel signals of the second row ROW<1> may be read out by the upper readout circuit portion 350, and, at the same time, the pixel signal indicating the blue colour B in the pixel signals of the third row ROW<2> may be read out by the lower readout circuit portion 330.

During the second half of the second row line time, the pixel signal indicating the red colour R in the pixel signals of the second row ROW<1> may be read out by the lower readout circuit portion 330, and, at the same time, the pixel signal indicating the green colour Gb in the pixel signals of the third row ROW<2> may be read out by the upper readout circuit portion 350.

During the second half of the second row line time, the digital signals corresponding to the pixel signals indicating the blue colour B and the green colour Gb of the first row ROW<0> may be outputted through the first and second channels CH0 and CH1.

Referring to FIG. 24B, during the first half of the third row line time, the pixel signal indicating the green colour Gr in the pixel signals of the fourth row ROW<3> may be read out by the upper readout circuit portion 350, and, at the same time, the pixel signal indicating the blue colour B in the pixel signals of the fifth row ROW<4> may be read out by the lower readout circuit portion 330.

During the first half of the third row line time, the digital signals corresponding to the pixel signals indicating the red colour R and the green colour Gr of the second row ROW<1> may be outputted through the first and second channels CH0 and CH1.

During the second half of the third row line time, the pixel signal indicating the red colour R in the pixel signals of the fourth row ROW<3> may be read out by the lower readout circuit portion 330, and, at the same time, the pixel signal indicating the green colour Gb in the pixel signals of the fifth row ROW<4> may be read out by the upper readout circuit portion 350.

During the second half of the third row line time, the digital signals corresponding to the pixel signals indicating the blue colour B and the green colour Gb of the third row ROW<2> may be outputted through the first and second channels CH0 and CH1.

During the first half of the fourth row line time, the pixel signal indicating the green colour Gr in the pixel signals of the sixth row ROW<5> may be read out by the upper readout circuit portion 350, and, at the same time, the pixel signal indicating the blue colour B in the pixel signals of the seventh row ROW<6> may be read out by the lower readout circuit portion 330.

During the first half of the fourth row line time, the digital signals corresponding to the pixel signals indicating the red colour R and the green colour Gr of the fourth row ROW<3> may be outputted through the first and second channels CH0 and CH1.

During the second half of the fourth row line time, the pixel signal indicating the red colour R in the pixel signals of the sixth row ROW<5> may be read out by the lower readout circuit portion 330, and, at the same time, the pixel signal indicating the green colour Gb in the pixel signals of the seventh row ROW<6> may be read out by the upper readout circuit portion 350.

During the second half of the fourth row line time, the digital signals corresponding to the pixel signals indicating the blue colour B and the green colour Gb of the fifth row ROW<4> may be outputted through the first and second channels CH0 and CH1.

Lastly, although not illustrated, during the first half of the fifth row line time, the pixel signal indicating the green colour Gr in the pixel signals of the eighth row ROW<7> may be read out by the upper readout circuit portion 350.

During the first half of the fifth row line time, the digital signals corresponding to the pixel signals indicating the red colour R and the green colour Gr of the sixth row ROW<5> may be outputted through the first and second channels CH0 and CH1.

Also, although not illustrated, during the second half of the fifth row line time, the pixel signal indicating the red colour R in the pixel signals of the eighth row ROW<7> may be read out by the lower readout circuit portion 330.

Figure 25:
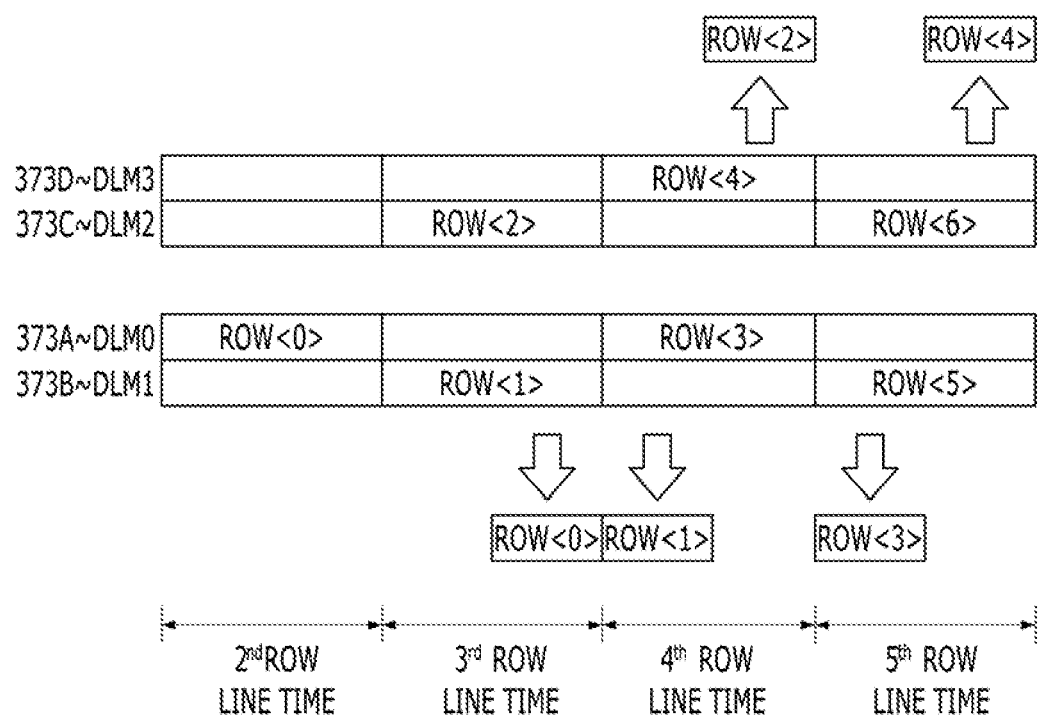
FIG. 25 is a timing diagram illustrating the operation of an image sensing device in accordance with an exemplary embodiment of the present invention.

FIG. 25 is a timing diagram illustrating operation of the line memory control unit 371, and the first to fourth line memory units 373A to 373D.

Referring to FIG. 25, during the second half of the second row line time, the line memory control unit 371 may store the digital signals of the first row ROW<0>, which are transmitted through the first and second channels CH0 and CH1, into the first line memory unit 373A.

During the first half of the third row line time, the line memory control unit 371 may store the digital signals of the second row ROW<1>, which are transmitted through the first and second channels CH0 and CH1, into the second line memory unit 373B.

During the second half of the third row line time, the line memory control unit 371 may store the digital signals of the third row ROW<2>, which are transmitted through the first and second channels CH0 and CH1, into the third line memory unit 373C.

During the third row line time, the line memory control unit 371 may control the digital signals of the first row RWO<0>, which are stored in the first line memory unit 373A, to be outputted.

During the first half of the fourth row line time, the line memory control unit 371 may store the digital signals of the fourth row ROW<3>, which are transmitted through the first and second channels CH0 and CH1, into the first line memory unit 373A.

During the second half of the fourth row line time, the line memory control unit 371 may store the digital signals of the fifth row ROW<4>, which are transmitted through the first and second channels CH0 and CH1, into the fourth line memory unit 373D.

During the fourth row line time, the line memory control unit 371 may control the digital signals of the second and third rows ROW<1>, and ROW<2>, which are stored in the second and third line memory units 373B, and 373C, to be outputted sequentially in row sequence order.

During the first half of the fifth row line time, the line memory control unit 371 may store the digital signals of the sixth row ROW<5>, which are transmitted through the first and second channels CH0 and CH1, into the second line memory unit 373B.

During the second half of the fifth row line time, the line memory control unit 371 may store the digital signals of the seventh row ROW<6>, which are transmitted through the first and second channels CH0 and CH1, into the third line memory unit 373C.

During the fifth row line time, the line memory control unit 371 may control the digital signals of the fourth and fifth rows ROW<3>, and ROW<4>, which are stored in the first and fourth line memory units 373A, and 373D, to be outputted sequentially in row sequence order.

After that, although not illustrated, during the first half of the sixth row line time, the line memory control unit 371 may store the digital signals of the eighth row ROW<7>, which are transmitted through the first and second channels CH0 and CH1, into the fourth line memory unit 373D.

During the sixth row line time, the line memory control unit 371 may control the digital signals of the sixth and seventh rows ROW<5>, and ROW<6>, which are stored in the second and third line memory units 373B, and 373C, to be outputted sequentially in row sequence order.

In accordance with the exemplary embodiment of the present invention, when compared with the comparative example described with reference to FIGS. 1 to 8, the image sensing device may read out the pixel signal for each colour through lower and upper readout paths with a reduced number of digital line memories.

Although various embodiments have been described for illustrative purposes, it will be apparent to those skilled in the art that various changes and modifications may be made without departing from the spirit and scope of the invention as defined in the following claims.

For example, the exemplary embodiments of the present invention are disclosed with respect to the 2-shared pixel structure, and the 4-shared pixel structure. This should not be construed as a limitation of the present invention. The present invention can be expanded to pixel structures of eight or more pixels.

What is claimed is:

1. An image sensing device comprising:
   a pixel array including a plurality of pixels arranged in row and column directions;
   a row control portion suitable for controlling a part of a plurality of rows included in the pixel array by a unit of two or more sequential rows so that pixel signals are simultaneously outputted from the pixel array through the two or more sequential rows;
   a first readout circuit portion suitable for sequentially reading out a part of the pixel signals in row sequence order;
   a second readout circuit portion suitable for sequentially reading out the rest of the pixel signals in row sequence order; and
   a storage portion suitable for storing on row by row basis the readout signals sequentially read out in row sequence order from the first and second readout circuit portions,
   wherein the plurality of pixels include a plurality of pixel groups, each of which includes a pair of adjacent pixels in the column direction,
   wherein each of the plurality of pixel groups has a 2-shared pixel structure where the pair of adjacent pixels are shared,
   wherein the storage portion comprises:
   first to fourth line memory units suitable for storing on row by row basis the read out signals, and outputting the signals, which are stored on row by row basis therein, in row sequence order; and
   a line memory control unit suitable for controlling the first to fourth line memory units.

2. The image sensing device of claim 1, wherein the row control portion controls both a first row and a last row of the pixel array by the unit of a single row, and the remaining rows of the pixel array by the unit of a pair of sequential rows.

3. The image sensing device of claim 1,
further comprising a plurality of column line groups corresponding to columns of the plurality of pixel groups, respectively,
wherein each of the plurality of column line groups comprises first and second column lines, to which a pair of pixel groups in the column direction, among the plurality of pixel groups, are coupled, respectively.

4. The image sensing device of claim 3, wherein the first readout circuit portion reads out the pixel signals from the pixels indicating a first colour among the pixels that indicate the first and a second colours, and are disposed in each of the plurality of rows in the pixel array.

5. The image sensing device of claim 4, wherein the first readout circuit portion comprises:
a plurality of first readout units corresponding to the plurality of column line groups, respectively, and suitable for outputting a plurality of first readout signals by reading out the pixel signals from the pixels on row by row basis; and
a first serialization unit suitable for serializing the plurality of first readout signals, and outputting the serialized first readout signals to the storage portion.

6. The image sensing device of claim 5, wherein each of the plurality of first readout units comprises:
a path selection means suitable for alternately selecting one of the first and second column lines at every row line time;
a signal conversion means suitable for converting the pixel signals outputted through the path selection means into a digital signal; and
a latch means suitable for latching the digital signal outputted from the signal conversion means.

7. The image sensing device of claim 4, wherein the second readout circuit portion reads out the pixel signals from the pixels indicating the second colour among the pixels that indicate the first and second colours.

8. The image sensing device of claim 7, wherein the second readout circuit portion comprises:
a plurality of second readout units corresponding to the plurality of column line groups, respectively, and suitable for outputting a plurality of second readout signals by reading out the pixel signals from the pixels on row by row basis; and
a second serialization unit suitable for serializing the plurality of second readout signals, and outputting the serialized second readout signals to the storage portion.

9. An image sensing device comprising:
a pixel array including a plurality of pixels arranged in row and column directions;
a row control portion suitable for controlling a part of a plurality of rows included in the pixel array by a unit of two or more sequential rows so that pixel signals are simultaneously outputted from the pixel array through the two or more sequential rows;
a first readout circuit portion suitable for sequentially reading out a part of the pixel signals in row sequence order;
a second readout circuit portion suitable for sequentially reading out the rest of the pixel signals in row sequence order; and
a storage portion suitable for storing on row by row basis the readout signals sequentially read out in row sequence order from the first and second readout circuit portions,
wherein the plurality of pixels include a plurality of pixel groups, each of which includes 2 pairs of adjacent pixels in the row and column directions,
wherein each of the plurality of pixel groups has a 4-shared pixel structure where the 2 pairs of adjacent pixels are shared.

10. The image sensing device of claim 9,
further comprising a plurality of column line groups corresponding to columns of the plurality of pixel groups, respectively,
wherein each of the plurality of column line groups comprises first and second column lines, to which a pair of pixel groups in the column direction among the plurality of pixel groups are coupled, respectively.

11. The image sensing device of claim 10, wherein the first readout circuit portion reads out the pixel signals from the pixels indicating a first colour among the pixels that indicate the first and a second colours, and are disposed in each of the plurality of rows in the pixel array.

12. The image sensing device of claim 11, wherein the first readout circuit portion comprises:
a plurality of first readout units corresponding to the plurality of column line groups, respectively, and suitable for outputting a plurality of first readout signals by reading out the pixel signals from the pixels on row by row basis; and
a first serialization unit suitable for serializing the plurality of first readout signals, and outputting the serialized first readout signals to the storage portion.

13. The image sensing device of claim 12, wherein each of the plurality of first readout units comprises:
a path selection means suitable for alternately selecting one of the first and second column lines at every half of a row line time;
a signal conversion means suitable for converting the pixel signals outputted through the path selection means into a digital signal; and
first to third latch means suitable for selectively latching the digital signal outputted from the signal conversion means.

14. The image sensing device of claim 11, wherein the second readout circuit portion reads out the pixel signals from the pixels indicating the second colour among the pixels that indicate the first and second colours.

15. The image sensing device of claim 14, wherein the second readout circuit portion comprises:
a plurality of second readout units corresponding to the plurality of column line groups, respectively, and suitable for outputting a plurality of second readout signals by reading out the pixel signals from the pixels on row by row basis; and
a second serialization unit suitable for serializing the plurality of second readout signals, and outputting the serialized second readout signals to the storage portion.

16. The image sensing device of claim 15, wherein each of the plurality of second readout units comprises:
a path selection means suitable for alternately selecting one of the first and second column lines at every half of the unit row line time;
a signal conversion means suitable for converting the pixel signals outputted through the path selection means into a digital signal; and first to third latch means suitable for selectively latching the digital signal outputted from the signal conversion means.

17. The image sensing device of claim 9, wherein the storage portion comprises:
   first to fourth line memory units suitable for storing on row by row basis the read out signals, and outputting the signals, which are stored on row by row basis therein, in row sequence order; and
   a line memory control unit suitable for controlling the first to fourth line memory units.

18. An image sensing device comprising:
   a pixel array including a plurality of pixels arranged in row and column directions;
   a row control portion suitable for controlling a part of a plurality of rows included in the pixel array by a unit of two or more sequential rows so that pixel signals are simultaneously outputted from the pixel array through the two or more sequential rows;
   a first readout circuit portion suitable for sequentially reading out a part of the pixel signals in row sequence order;
   a second readout circuit portion suitable for sequentially reading out the rest of the pixel signals in row sequence order; and
   a storage portion suitable for storing on row by row basis the readout signals sequentially read out in row sequence order from the first and second readout circuit portions,
   a plurality of column line groups corresponding to columns of the plurality of pixel groups, respectively,
   wherein the plurality of pixels include a plurality of pixel groups, each of which includes a pair of adjacent pixels in the column direction,
   wherein each of the plurality of pixel groups has a 2-shared pixel structure where the pair of adjacent pixels are shared,
   wherein each of the plurality of column line groups comprises first and second column lines, to which a pair of pixel groups in the column direction, among the plurality of pixel groups, are coupled, respectively,
   wherein the first readout circuit portion reads out the pixel signals from the pixels indicating a first colour among the pixels that indicate the first and a second colours, and are disposed in each of the plurality of rows in the pixel array and the second readout circuit portion reads out the pixel signals from the pixels indicating the second colour among the pixels that indicate the first and second colours,
   wherein the first and second readout circuit portions comprise, respectively:
   a plurality of readout units corresponding to the plurality of column line groups, respectively, and suitable for outputting a plurality of first and second readout signals by reading out the pixel signals from the pixels on row by row basis; and
   a serialization unit suitable for serializing the plurality of first and second readout signals, and outputting the serialized first and second readout signals to the storage portion,
   wherein each of the plurality of first and second readout units comprises, respectively:
   a path selection means suitable for alternately selecting one of the first and second column lines at every row line time;
   a signal conversion means suitable for converting the pixel signals outputted through the path selection means into a digital signal; and
   a latch means suitable for latching the digital signal outputted from the signal conversion means.

* * * * *